US008201072B2

(12) United States Patent  (10) Patent No.: US 8,201,072 B2
Matulic  (45) Date of Patent: Jun. 12, 2012

(54) IMAGE FORMING APPARATUS, ELECTRONIC MAIL DELIVERY SERVER, AND INFORMATION PROCESSING APPARATUS

(75) Inventor: Fabrice Matulic, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 1332 days.

(21) Appl. No.: 11/716,574

(22) Filed: Mar. 12, 2007

(65) Prior Publication Data
US 2007/0230778 A1 Oct. 4, 2007

(30) Foreign Application Priority Data

Mar. 20, 2006 (JP) .................................. 2006-077165
Mar. 5, 2007 (JP) .................................. 2007-054528

(51) Int. Cl.
*G06F 17/00* (2006.01)
(52) U.S. Cl. ...................................................... 715/200
(58) Field of Classification Search .................. 715/200, 715/255, 810, 835, 838, 752
See application file for complete search history.

(56) References Cited

U.S. PATENT DOCUMENTS

| 5,812,862 | A  | * | 9/1998  | Smith et al. ..................... 715/209 |
| 5,892,843 | A  | * | 4/1999  | Zhou et al. ..................... 382/176 |
| 6,088,709 | A  | * | 7/2000  | Watanabe ..................... 715/233 |
| 6,157,738 | A  | * | 12/2000 | Wang ..................... 382/199 |
| 6,173,287 | B1 | * | 1/2001  | Eberman et al. ............. 715/232 |
| 6,335,742 | B1 | * | 1/2002  | Takemoto ..................... 715/781 |
| 6,613,100 | B2 | * | 9/2003  | Miller ........................... 715/273 |
| 6,732,102 | B1 | * | 5/2004  | Khandekar ............. 1/1 |
| 6,931,600 | B1 | * | 8/2005  | Pittman ........................ 715/767 |
| 7,027,809 | B1 | * | 4/2006  | Smith et al. ..................... 455/423 |
| 7,047,238 | B2 | * | 5/2006  | Tada et al. ............. 1/1 |
| 7,171,456 | B2 | * | 1/2007  | Honma et al. ................. 709/219 |
| 7,280,475 | B2 | * | 10/2007 | Tanaka et al. ................. 370/235 |
| 7,392,484 | B1 | * | 6/2008  | Garfinkel et al. ............. 715/751 |
| 7,596,750 | B2 | * | 9/2009  | Inose ............................. 715/255 |
| 7,689,933 | B1 | * | 3/2010  | Parsons ........................ 715/838 |
| 8,046,673 | B2 | * | 10/2011 | Polo-Malouvier et al. ... 715/200 |
| 2002/0029259 | A1 | * | 3/2002 | Okada ........................... 709/219 |
| 2002/0069254 | A1 | * | 6/2002 | Watanabe et al. ............. 709/206 |
| 2003/0018727 | A1 | * | 1/2003 | Yamamoto ..................... 709/206 |
| 2003/0033221 | A1 | * | 2/2003 | Fuwa et al. ..................... 705/27 |

(Continued)

FOREIGN PATENT DOCUMENTS

CN  1245935 A  3/2000

(Continued)

OTHER PUBLICATIONS

Shneiderman et al., Direct Annotation: A Drag-and-Drop Strategy for Labeling Photos, IEEE 2000, pp. 88-95.*

(Continued)

*Primary Examiner* — Cong-Lac Huynh
(74) *Attorney, Agent, or Firm* — Dickstein Shapiro LLP

(57) ABSTRACT

An image forming apparatus includes an information delivery apparatus including an analysis unit and a first display controller. The analysis unit analyzes data to extract data elements. The first display controller displays preview of the data elements on a first display unit. A data element selected from the preview is transmitted to an information processing apparatus via a network. The information processing apparatus displays the data element as a symbol at a predetermined position on a second display unit. The second display unit displays an application window. When the second display unit receives input to select the symbol and place it on the application window, the data element is entered into a corresponding application and the symbol is displayed on the application window.

8 Claims, 20 Drawing Sheets

U.S. PATENT DOCUMENTS

| | | | |
|---|---|---|---|
| 2003/0160813 A1* | 8/2003 | Raju | 345/730 |
| 2003/0184598 A1* | 10/2003 | Graham | 345/838 |
| 2004/0017375 A1* | 1/2004 | Lui et al. | 345/581 |
| 2004/0243575 A1* | 12/2004 | Ohashi | 707/3 |
| 2005/0135677 A1* | 6/2005 | Seevers et al. | 382/165 |
| 2005/0259297 A1* | 11/2005 | Tanaka | 358/3.28 |
| 2006/0072162 A1* | 4/2006 | Nakamura et al. | 358/402 |
| 2006/0117108 A1* | 6/2006 | Salisbury et al. | 709/229 |
| 2006/0174020 A1* | 8/2006 | Walls et al. | 709/230 |
| 2006/0224940 A1* | 10/2006 | Lee | 715/500.1 |
| 2007/0055931 A1 | 3/2007 | Zaima et al. | |
| 2007/0156925 A1* | 7/2007 | Shigeta et al. | 709/246 |
| 2007/0168426 A1* | 7/2007 | Ludwig et al. | 709/204 |
| 2007/0220425 A1* | 9/2007 | Matulic | 715/530 |
| 2008/0043942 A1* | 2/2008 | Cardona et al. | 379/88.18 |
| 2008/0216111 A1* | 9/2008 | Alten et al. | 725/28 |
| 2009/0167783 A1* | 7/2009 | Fujinaga | 345/619 |
| 2009/0183140 A9* | 7/2009 | Peck et al. | 717/113 |

FOREIGN PATENT DOCUMENTS

| | | |
|---|---|---|
| JP | 09-006901 | 1/1997 |
| JP | 10-285325 A | 10/1998 |
| JP | 2002-318535 | 10/2002 |
| JP | 2003-111050 A | 4/2003 |
| JP | 2004-96198 A | 3/2004 |
| JP | 2005-182735 | 7/2005 |
| JP | 2005-244411 | 9/2005 |

OTHER PUBLICATIONS

Kurki et al., Agents in Delivering Personalized Content Based on Semantic Metadata, Google 1999, pp. 84-93.*
Podlazov, Nonblockability of Switches with the Cayley Graph Structure for Serial Transfer of Data Blocks. Generalized Hypercubes and Multidimensional Grids, Google 2003, pp. 153-166.*
Gaber et al., Cost-Efficient Mining Techniques for Data Streams, ACM 2004, pp. 109-114.*

* cited by examiner

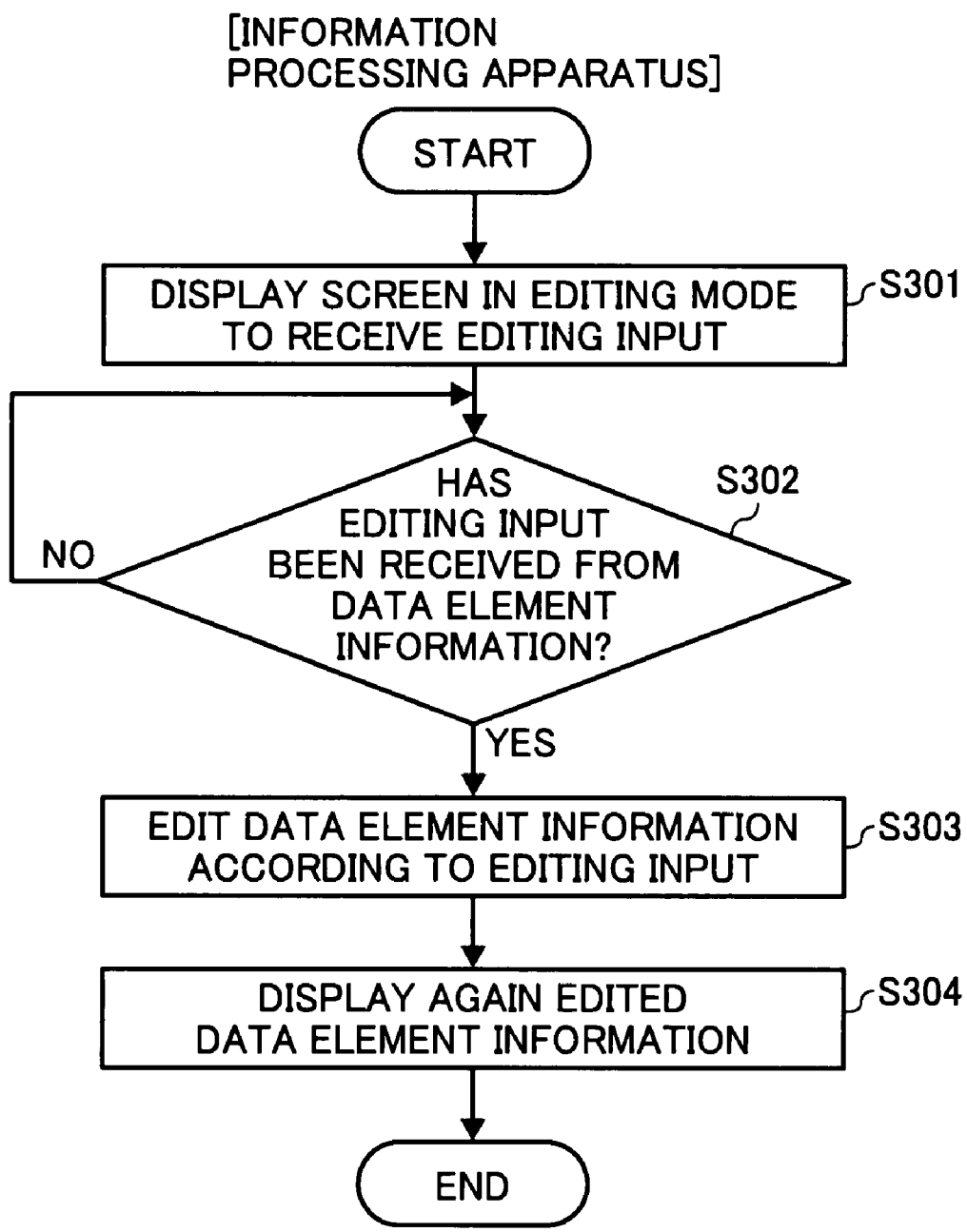

IMAGE FORMING APPARATUS, ELECTRONIC MAIL DELIVERY SERVER, AND INFORMATION PROCESSING APPARATUS

CROSS-REFERENCE TO RELATED APPLICATIONS

The present document incorporates by reference the entire contents of Japanese priority document, 2006-077165 filed in Japan on Mar. 20, 2006, and 2007-054528 filed in Japan on Mar. 5, 2007.

BACKGROUND OF THE INVENTION

1. Field of the Invention

The present invention relates to an image forming apparatus, an electronic mail delivery server, and an information processing apparatus.

2. Description of the Related Art

In recent years, network communication systems including a network multifunction product capable of communicating data with another terminal unit have been proposed. For example, Japanese Patent Application Laid-Open No. 2005-244411 discloses a technology for automatically transmitting a document, which is read by a scanner, to a destination which is obtained by optical character recognition (OCR) process.

In the conventional technology, text information and image information are distinguished in a read document to acquire a destination and body information from the text information, and the image information is transmitted by electronic mail (hereinafter, "email") to the destination as an attached file.

The conventional technology, however, requires a plurality of processes such that a document read by the scanner is subjected to a character recognition process and further to a process for email transmission. This causes an operator's work to be more complicated. In other words, if each document element being an element that forms input document information is extracted from the document information and a newly extracted document element can be always displayed on an information terminal, this becomes convenient for users.

SUMMARY OF THE INVENTION

It is an object of the present invention to at least partially solve the problems in the conventional technology.

According to an aspect of the present invention, an image forming apparatus includes an analysis unit that analyzes data to extract a data element, and, upon identifying attribute of the data element as text, performs character recognition on the data element, a display unit that displays the data element and receives input, and a communication unit that transmits the data element selected by the input to an information processing apparatus through a network.

According to another aspect of the present invention, an electronic mail delivery server includes a receiving unit that receives an electronic mail containing image information, an analysis unit that analyzes the electronic mail to extract a data element, and, upon identifying attribute of the data element as text, performs character recognition on the data element, and a transmitting unit that transmits the data element to a destination of the electronic mail through a network.

According to still another aspect of the present invention, an information processing apparatus includes a communication unit that receives a data element that constitutes data from an image forming apparatus connected through a network, an display unit that displays the data element as a symbol at a predetermined position on a screen, and receives a command to select and place the symbol on a window of an application, and an information processor that enters the data element corresponding to the symbol into the application in response to the command.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 13 is a flowchart of the operation of the information delivery system shown in FIG. 11;

DETAILED DESCRIPTION OF THE PREFERRED EMBODIMENTS

Exemplary embodiments of the present invention are explained in detail below with reference to the accompanying drawings.

Figure 1:
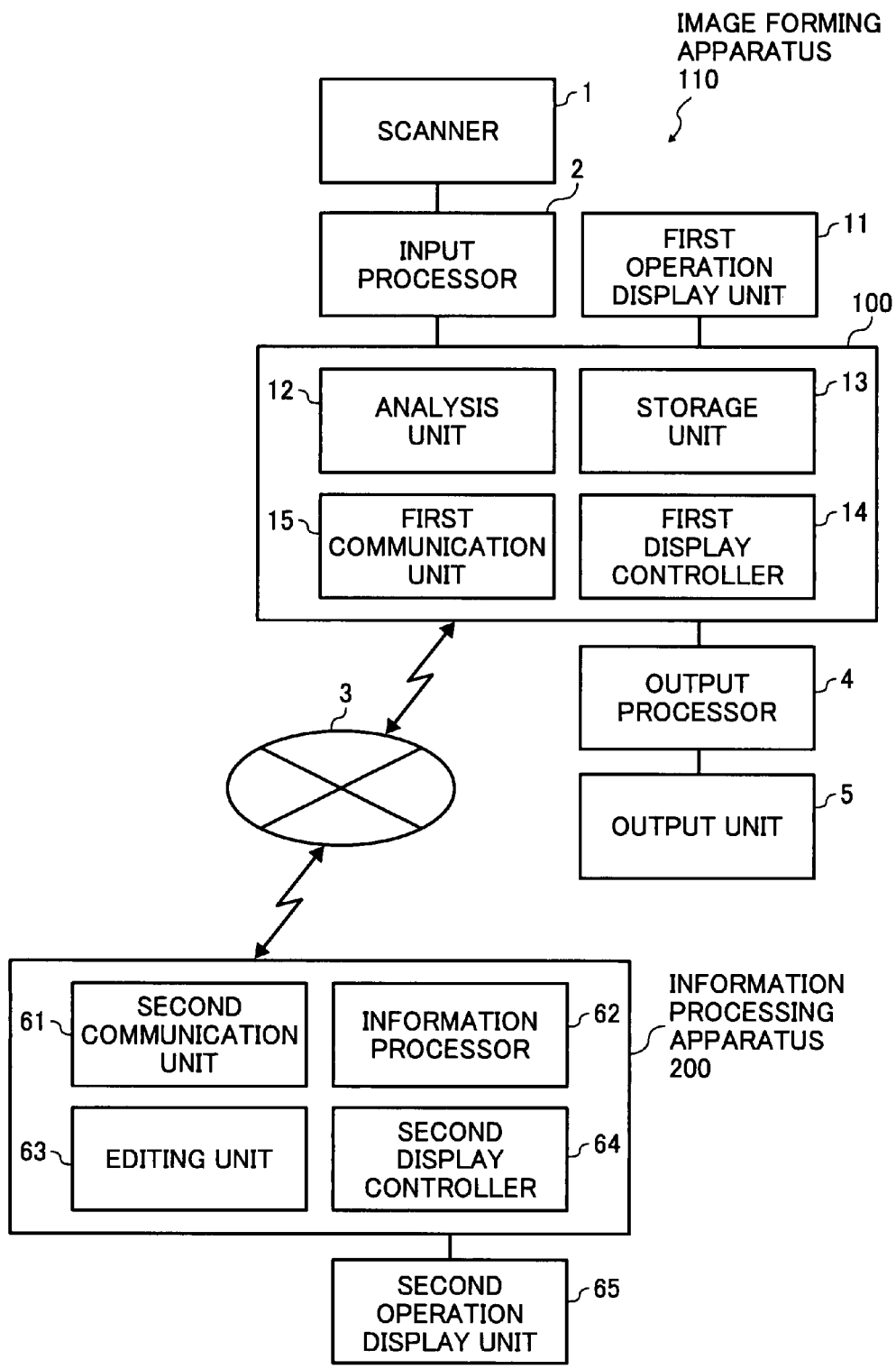
FIG. 1 is a functional block diagram of an information delivery system according to a first embodiment of the present invention.

FIG. 1 is a functional block diagram of an information delivery system according to the first embodiment of the present invention. The information delivery system includes an image forming apparatus 110 and an information processing apparatus 200 connected to each other through a network 3.

The image forming apparatus 110 analyzes input data to extract therefrom a data element, i.e., an element that constitutes the data, and displays preview of the extracted data element. The image forming apparatus 110 receives a command input through the preview, and transmits information on the selected data element to the information processing apparatus 200 through the network 3. The information processing apparatus 200 receives the data element information from the image forming apparatus 110 through the network 3, and displays the data element information in a contents bar (widget) arranged in a rectangular shape at a predetermined position on its screen using an icon as a symbol. The information processing apparatus 200 displays the window of an active (open) application. When the displayed icon is selected and a command is input to bring (place) the selected icon on the application window, the information processing apparatus 200 enters the data element information indicated by the icon into the application running thereon according to the command, and displays the data element information.

With this configuration, the image forming apparatus 110 extracts each data element from input data and displays extracted data elements. When any one of the data elements is selected from those displayed, the selected data element is transmitted to the information processing apparatus 200 and displayed on the screen. Thus, the data element can be used in another application active on the screen. This enables to obtain an information delivery system with high usability in which the data element extracted by the image forming apparatus 110 from the input data can be displayed in the information processing apparatus 200 and used in another application.

The image forming apparatus 110 includes a scanner 1, an input processor 2, an information delivery apparatus 100, an output processor 4, and an output unit 5. The information delivery apparatus 100 extracts a data element from an image read by the scanner 1 and transmits the extracted data element to the information processing apparatus 200. The information delivery apparatus 100 includes a first operation display unit 11, an analysis unit 12, a storage unit 13, a first display controller 14, and a first communication unit 15.

The scanner 1 reads data. The input processor 2 converts the analog data read by the scanner 1 to electronic digital data, and transmits the digitally converted image data to the information delivery apparatus 100. Referring to the input of the data, the first communication unit 15 can also receive data through the network 3. The information delivery apparatus 100 can also input thereto data stored in any one of various recording media through an input unit (not shown).

The storage unit 13 stores therein input image data and various types of digital data subjected to processing. The output processor 4 subjects the image data for the read image to output processing. The output unit 5 outputs an image of the image data subjected to the output processing. The image output is a function of the image forming apparatus.

The image forming apparatus inputs thereto electronic data through the scanner 1 or the network 3. In the information delivery apparatus 100, the analysis unit 12 analyzes an attribute of input data and extracts a data element that constitutes data, from the data.

The first display controller 14 displays the extracted data element on the first operation display unit 11. The first operation display unit 11 receives a selection input and editing inputs, from an operator, performed by touching the data element displayed thereon.

The first operation display unit 11 can be formed as a so-called touch panel having a liquid-crystal display function. The first communication unit 15 transmits the received data element to the information processing apparatus 200 through the network 3.

The analysis unit 12 analyzes which of attributes such as text, halftone image, graphic, image, and any other image type corresponds to the input data, and divides the data into areas by the attribute. Each element of the areas divided for each attribute is a data element.

Figure 2:
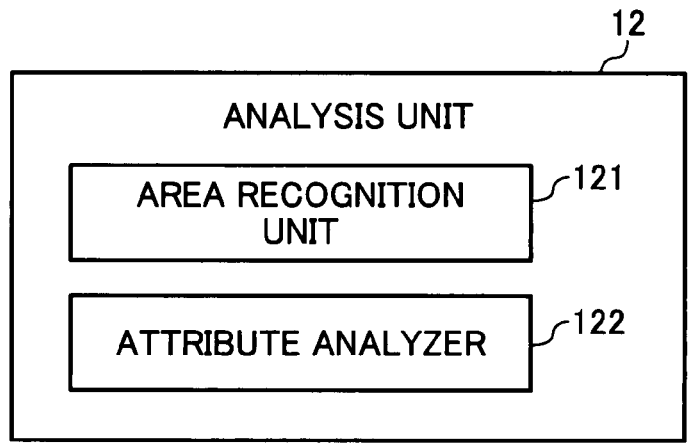
FIG. 2 is a functional block diagram of an analysis unit shown in FIG. 1.

FIG. 2 is a functional block diagram of the analysis unit 12. The analysis unit 12 includes an area recognition unit 121 and an attribute analyzer 122. The area recognition unit 121 recognizes each area of data. For example, the area recognition unit 121 recognizes a text attribute for each paragraph, and recognizes a photographic image attribute and a graphic image attribute for each photographic image and each graphic image, respectively. The area recognition unit 121 divides the data into areas based on the result of recognition. The area recognition unit 121 also recognizes each area of the data based on a well-known technology such as change in density of data, detection of an edge portion, and detection of a halftone area.

The area recognition unit 121 detects that a portion determined as a character continues to thereby recognize these portions as a text area. The area recognition unit 121 detects that a halftone pixel continues, and can thereby recognize these portions as a photographic image area. The area recognition unit 121 detects an edge portion and a sharp contrast between dark and light colors, and can thereby recognize these portions as a graphic image area. The area recognition unit 121 determines any portion other than the portions as being not text, photograph, and graphic images, and subjects these portions to area recognition process. These technologies are well known, and hence, detailed explanation is omitted.

The attribute analyzer 122 analyzes which information of the attributes such as text, photographic image, halftone image, graphic image, and any other image corresponds to the information for an area to be recognized by the area recognition unit 121. As a result, the area is divided for each attribute. Each element as the area divided for each attribute is generated as a data element.

Figure 3:
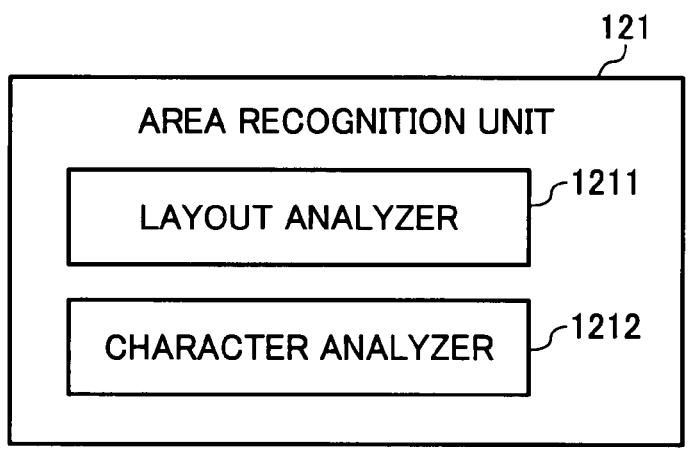
FIG. 3 is a functional block diagram of an area recognition unit shown in FIG. 2.

FIG. 3 is a functional block diagram of the area recognition unit 121. The area recognition unit 121 includes a layout analyzer 1211 and a character analyzer 1212. The layout analyzer 1211 subjects the data element extracted by the area recognition unit 121 and the attribute analyzer 122 to a process for analyzing a layout structure of the data. The layout analysis performed by the layout analyzer 1211 is to apply detection information such as edge detection, halftone detection, and pixel position detection to a well-known algorithm, to analyze each layout of divided areas. Alternatively, because the data elements are already extracted, the extracted data elements are applied to the known algorithm, and this enables the layout analysis. The character analyzer 1212 subjects the data element, which is analyzed as the text attribute, to character recognition process.

Figure 4:
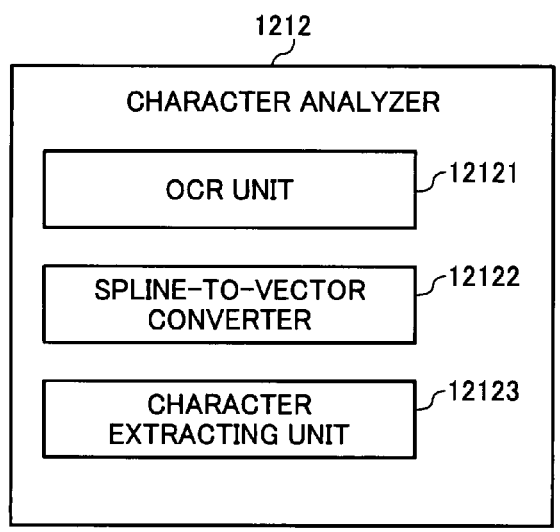
FIG. 4 is a functional block diagram of a character analyzer shown in FIG. 3.

FIG. 4 is a functional block diagram of the character analyzer 1212. The character analyzer 1212 converts a character element to a machine-processable format. The character analyzer 1212 includes an optical character recognition (OCR) unit 12121, a spline-to-vector converter 12122, and a character extracting unit 12123.

The character extracting unit 12123 extracts a character by contrast detection. The spline-to-vector converter 12122 subjects the extracted character to spline shaping. The OCR unit 12121 optically reads a character read as an image to perform character recognition. The character analysis is possible by applying a known algorithm thereto.

The character analyzer 1212 converts a character element to a machine-processable format, and this enables the editing to be accurate and quick. The OCR unit 12121 extracts a character image as text information, and so, efficient and highly user-friendly display and editing become possible. The character can be more smoothly displayed by the spline-to-vector converter 12122. Furthermore, the character analyzer 1212 includes the character extracting unit 12123, which enables to accurately clip a character and perform character analysis.

The analysis unit 12 can determine an attribute of a divided area based on an input of the set attribute, by the operator, which is received by the first operation display unit 11. For example, there is a case where the operator determines, from the displayed screen, that a text image analyzed and displayed by the analysis unit 12 should actually be a photographic image, and where the operator provides input to display the photographic image. In this case, the analysis unit 12 receives the attribute determined as the photographic image. With this feature, the attribute of the data element being the divided area can be changed or determined through the input by the operator.

The first operation display unit 11 receives an input as a touch thereon with a finger, a stylus pen, or any other touching tool. The first operation display unit 11 detects a touch at each point on a display screen and accepts the touch as input using a known technology such as a resistive system for detecting a change in resistance by the pressure applied from the finger or the pen, or a capacitive system (analog capacity coupling scheme). As a touch type, an example of touch input for inputting by touching the first operation display unit 11 is explained below, but the type is not necessarily limited only to touch input. Therefore, various types of input system including a mouse, a keyboard, and a press switch can be used.

Figure 5:
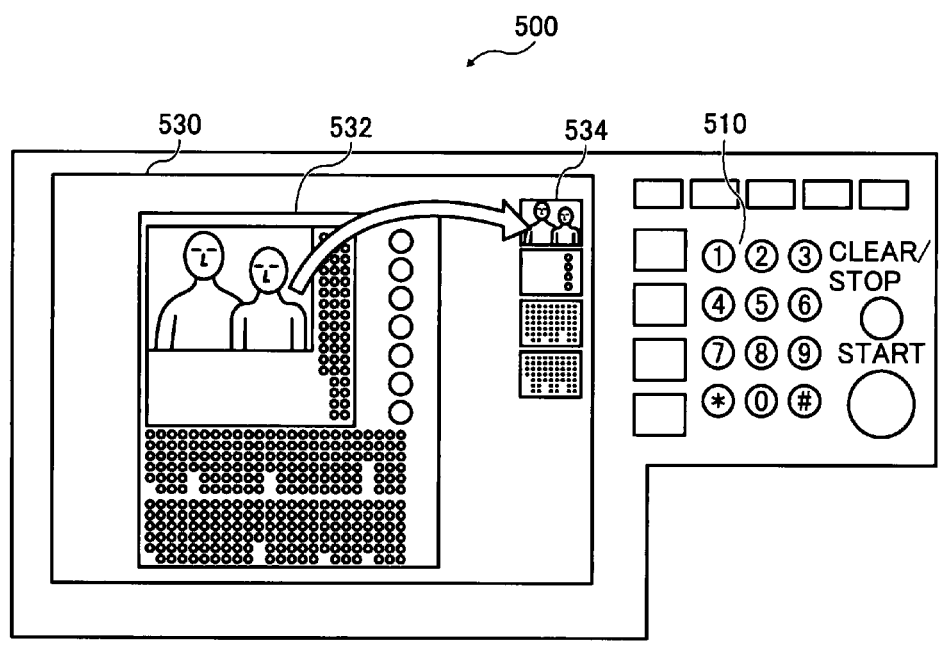
FIGS. 5 and 6 are examples of a display screen of a first operation display unit shown in FIG. 1.

FIG. 5 is one example of a display screen of the first operation display unit 11. An operation display screen 500 of the first operation display unit 11 includes an operation unit 510 and a display unit 530. Numerals, edit items, and Start for image output can be input through the operation unit 510.

The display unit 530 displays thereon a preview image 532 and an element image 534. The preview image 532 represents input data, and the element image 534 is an element image selected from data elements extracted by the analysis unit 12. The first display controller 14 displays the input image data and the data element extracted by the analysis unit 12 on the first operation display unit 11 in the form as shown in FIG. 5.

The data element is selected from the preview image 532 through a copying-operation by touch input using the display unit 530 as an input interface, and displayed in element image mode as the element image 534. The selection is possible by touch input using a drag-and-drop operation. Moreover, the selection is also possible by touch input using a copy-and-paste operation.

Figures 6A, 6B:
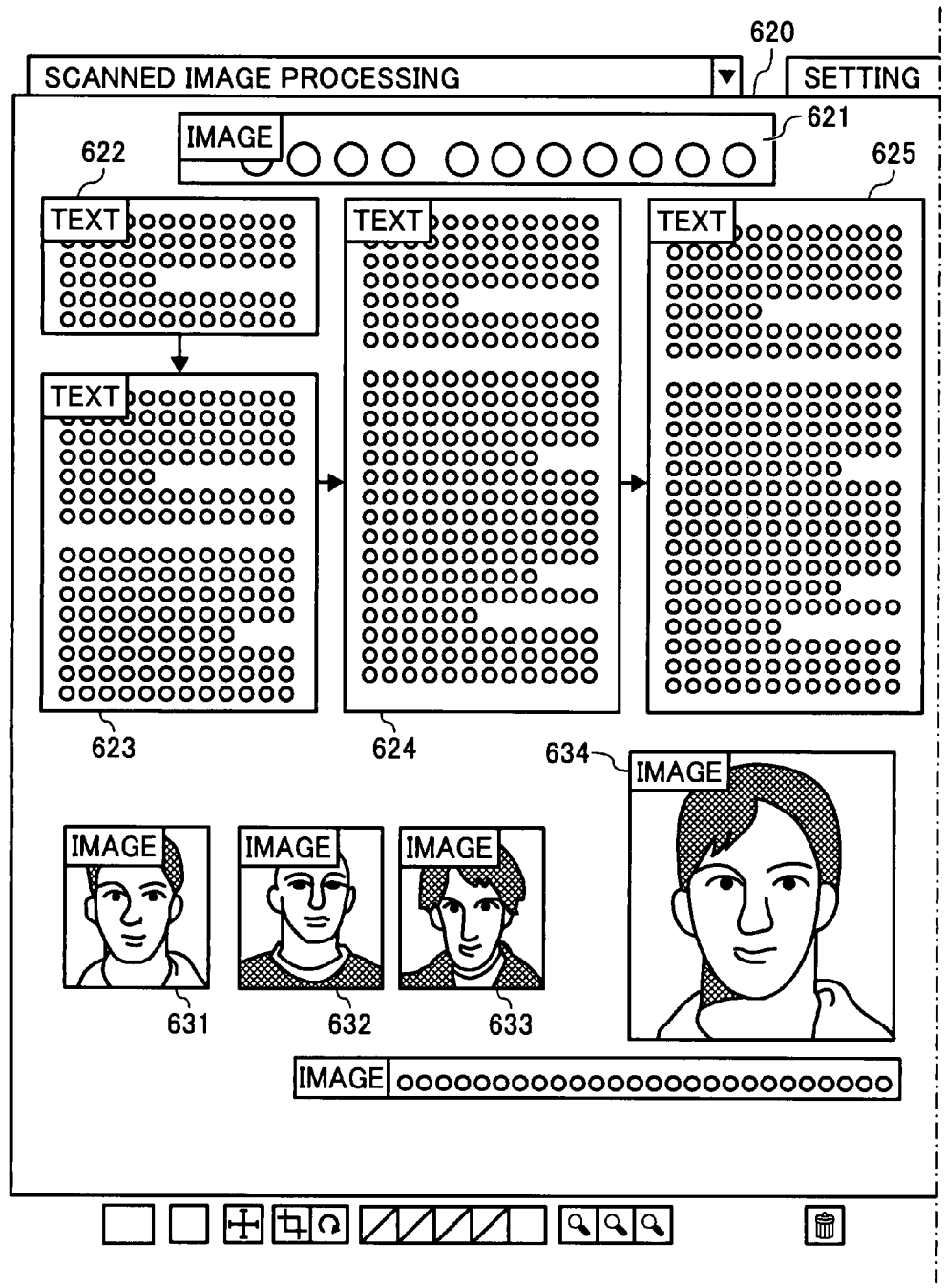
Figure 6B:
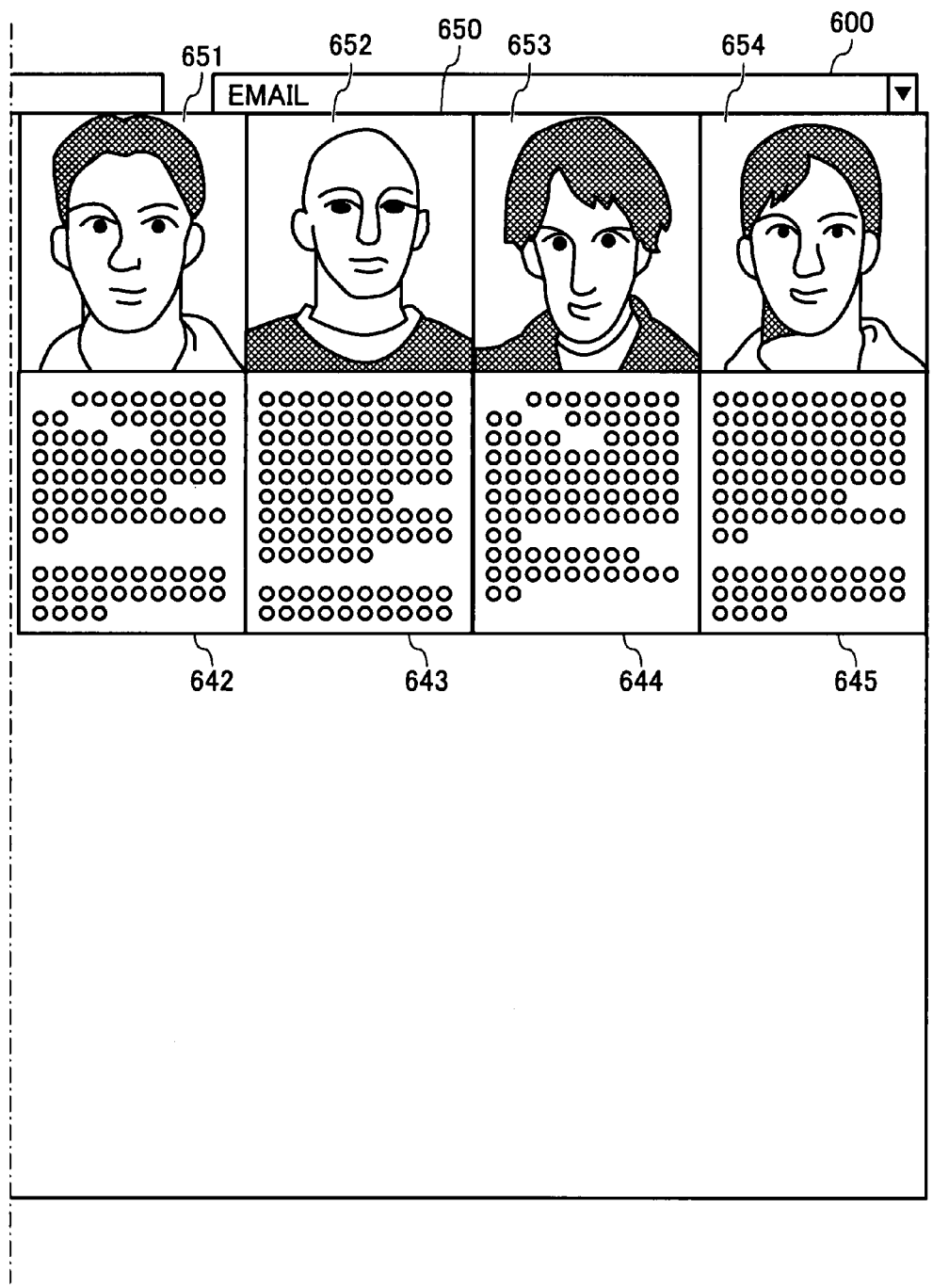

FIG. 6 is another example of a display screen of the first operation display unit 11. In the first operation display unit 11, a screen 600, according to the other example, is displayed by being divided into a preview screen 620 and an element image display 650. The preview screen 620 is divided into data elements and displayed. The element image display is also divided based on data elements.

Data elements 622 to 625 and 631 to 634 are now selected by the operator, and are set in the element image display 650 provided on the right side in the element image mode using the drag-and-drop operation. The data elements 622 to 625 are selected from a data element 621 and the data elements 622 to 625 which are text elements in the preview screen 620, and are copied to data elements 642 to 645 to be set in the element image display 650 on the right side.

Likewise, the data elements 631 to 634 which are photographic images are selected by the operator, and are copied to data elements 651 to 654 which are the photographic images to be set in the element image display 650 on the right side using the drag-and-drop operation.

Various types of edit settings or parameters can be input through the first operation display unit 11 using this screen as an interface. The first display controller 14 subjects data element information to editing in response to an editing input, and displays again the data elements in the element image mode. For example, an image of the data element 651 can be subjected to filtering to enable the background of a person to be made brighter. The first operation display unit 11 can also be configured to receive input for various settings including the edit settings and print settings from two-module display.

The first display controller 14 can also subject the data element to editing as appropriate element information. For example, image information can also be reduced according to a communication function. To display the data element (photographic image) 634, a thumbnail image thereof is created, and the thumbnail image can be used as an icon image for the photographic image. If it is to be actually transmitted, not the thumbnail image but its original element image information is transmitted.

If the data element extracted as character is to be inserted into the element image mode on the right side by touch input using the drag-and-drop operation, the data element is inserted therein for each element as not character image information but as text information which has already been subjected to character analysis.

The first display controller 14 associates display of the data elements divided by the analysis unit 12 in a preview image with display thereof in the element image mode, to be stored in the storage unit 13. With this association, the editing can be subjected to a corresponding original data element depending on the editing input from the element image mode.

The first operation display unit 11 also receives inputs from the operator such as a destination, an attribute of a data element, and deletion or addition of a data element in the element image mode.

The operation input through the first operation display unit 11 can be performed based on a system of selecting it through touch input by the operator, from a pull-down menu pulled down on the first operation display unit 11. The pull-down menu is possible to include, for example, Add, Shift, Delete, Enlarge/Reduce, and Input of date (not shown). Alternatively, these menu items can be made to appear with a right click operation. These technologies are well known, and hence, detailed explanation thereof is omitted.

For example, in a Delete operation, the first operation display unit 11 receives an input to delete the data element 652 in the element image mode, and the first display controller 14 newly displays a status (not shown) without the data element 652 in the element image display 650 of the first operation display unit 11.

The first operation display unit 11 can also accept a drag operation for the data element to be displayed using a stylus pen or the like, in addition to touch input with a finger, because using the stylus pen allows a finer operation. Further, in addition to the drag operation, by displaying a predetermined menu on the first operation display unit 11 and by selecting an item from the menu by touch input, a data element can be inserted in email module display and displayed.

The first communication unit 15 transmits information for the data element displayed in the element image display 650 of the first operation display unit 11, to the information processing apparatus 200 through the network 3. With this feature, the image forming apparatus can select a data element while viewing a preview image on the first operation display unit 11, to automatically transmit the selected data element to the information processing apparatus.

The image forming apparatus can also transmit display information in either the preview image mode or the element image mode or in both modes displayed by the first operation display unit 11, to the output processor 4, and can output an image through the output unit 5. Output of the data edited in the information delivery apparatus 100 can be implemented by some other means according to various functions of the image forming apparatus such as an output using a facsimile transmission function.

The information processing apparatus receives the information for the data element extracted and selected in the image forming apparatus through the network, displays the information on the screen, and enters it into another application running on the screen, and this allows the use of the information. In this manner, the data element extracted from the input data by the image forming apparatus is displayed in the information processing apparatus. Therefore, by placing the displayed data element on the application window running on the information processing apparatus, the operator can use the data element in the application.

The information processing apparatus 200 includes a second communication unit 61, an information processor 62, an editing unit 63, a second display controller 64, and a second operation display unit 65 (FIG. 1).

The second communication unit 61 receives the data element information transmitted by the information delivery apparatus 100 through the network 3.

The second display controller 64 displays the received data element information in a contents bar using an icon on the second operation display unit 65.

The second operation display unit 65 displays, when an application such as Word (TM) has started, the screen or window of the application and receives an instruction input to select the displayed icon to be placed on the application screen or window.

The information processor 62 enters the data element information indicated by the icon into the application according to the instruction input received through the second operation display unit 65.

The editing unit 63 subjects the data element information selected by the second operation display unit 65 to, if an editing input is received, the received editing. The second display controller 64 displays the data element information subjected to the editing on the second operation display unit 65.

Figure 7:
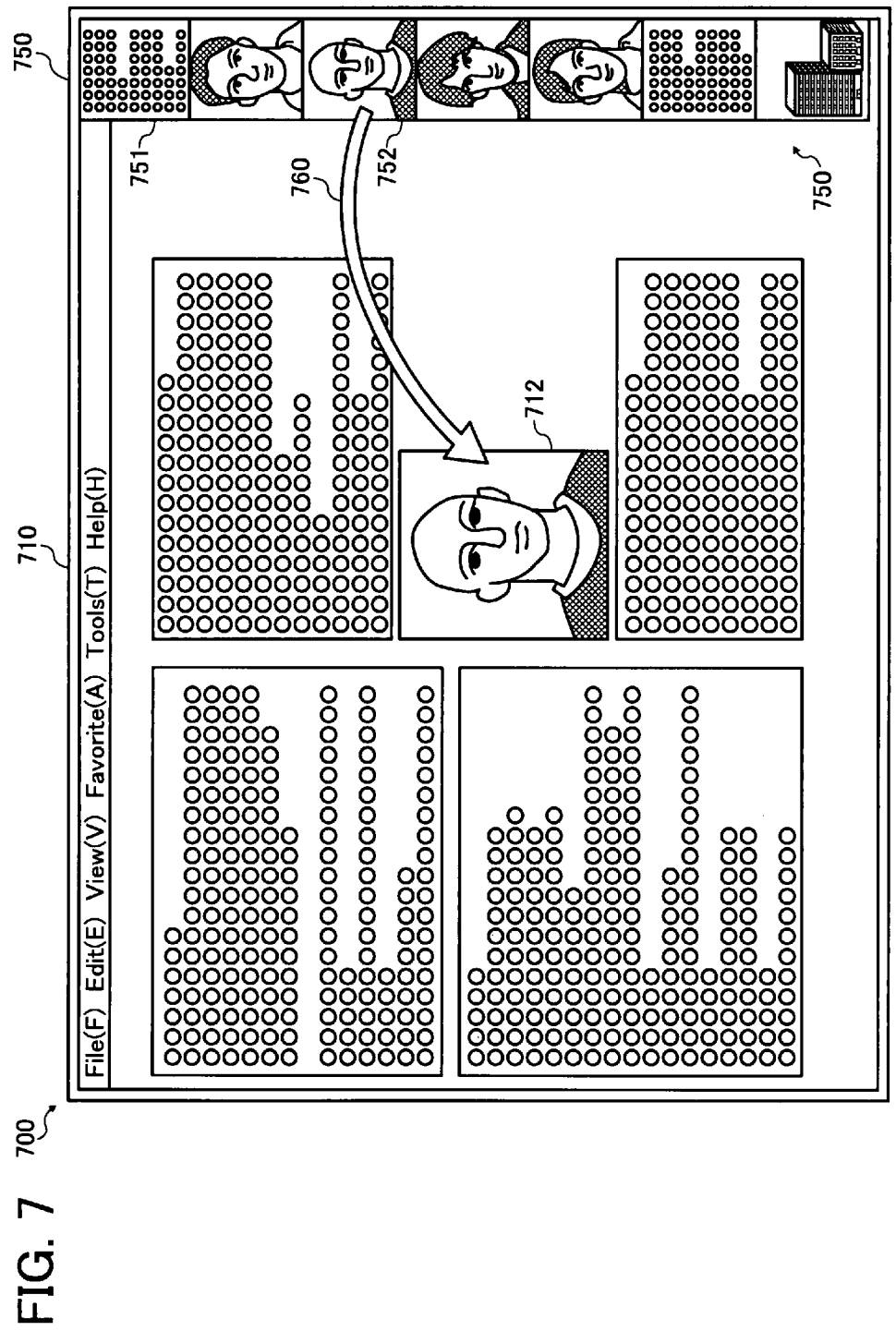
FIG. 7 is one example of a display screen of a second operation display unit shown in FIG. 1.

FIG. 7 is one example of a display screen of the second operation display unit 65. The mechanical configuration of the second operation display unit 65 is basically the same as the first operation display unit 11. For example, the second operation display unit 65 receives touch input in the same manner as explained for the first operation display unit 11.

Another application screen 710 and a contents bar 750 that displays data elements in the form of being set therein are displayed on a screen 700 of the second operation display unit 65. Displayed in the contents bar 750 are, for example, a text image 751 and an image 752, and the operator inserts the image 752 in an editing screen of a word processor displayed on the left side by touch input using the drag-and-drop operation indicated by arrow 760. An image 712 is a resulting image after the insertion. Not only the image 752 but the text image 751 as text information can be inserted therein.

The information processor 62 converts the image 752 selected by the drag-and-drop operation to a data format so that the data can be inserted in the word processor. In the active word processor, the converted image is inserted into a location specified by touch input to place the image thereon.

If the data element set in the contents bar 750 is subjected to the editing before its insertion, the operator selects an editing item on the second operation display unit 65 and inputs the editing item. Even if the editing item appears by a right click, the pull-down menu can also be displayed. The editing unit 63 subjects the data element information to the editing according to the editing item which is selected and input.

The second display controller 64 again displays the data element information subjected to the editing in the contents bar 750. In this case, the data element image can be updated with the edited data element information and the updated data element image can be displayed, or the image before the editing can be displayed in such a manner that the images overlap each other. It is also possible to display another contents bar (not shown) in which the data element image after being edited is set.

Figure 8A:
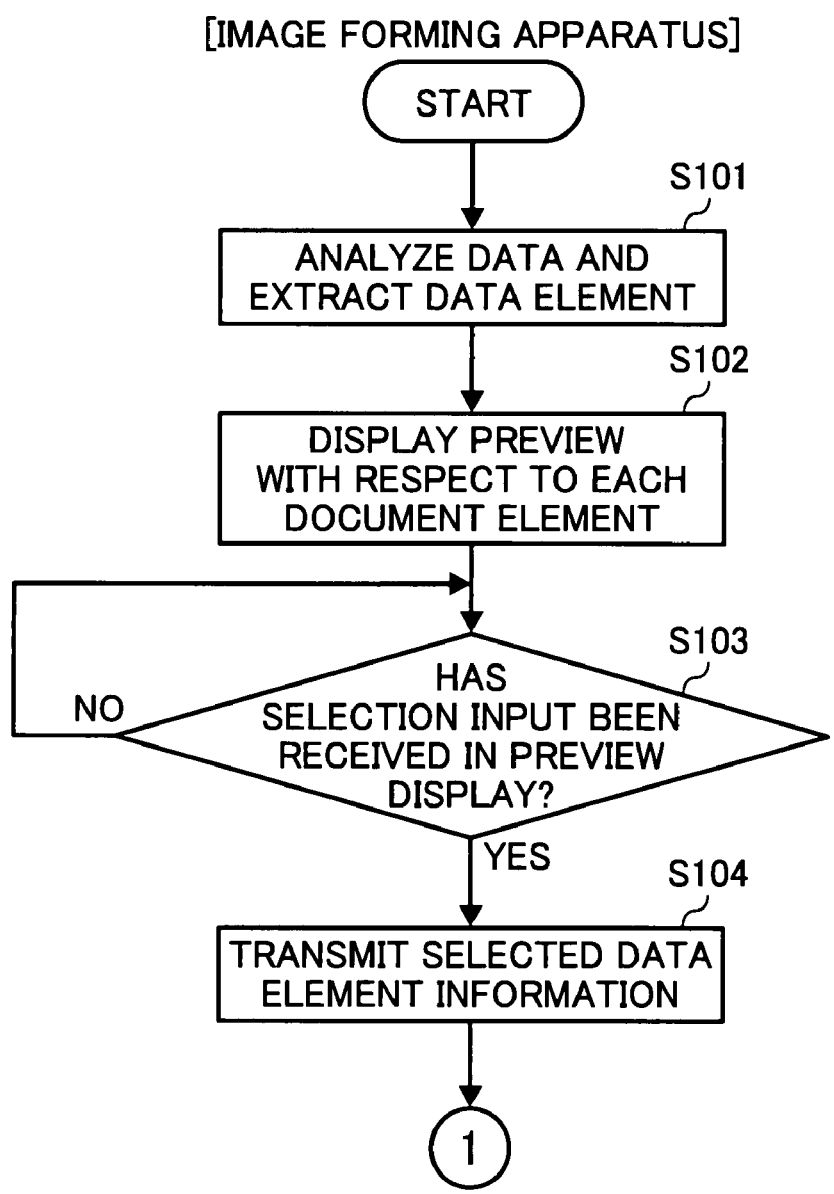
FIG. 8 is a flowchart of the operation of the information delivery system, shown in FIG. 1.
Figure 8B:
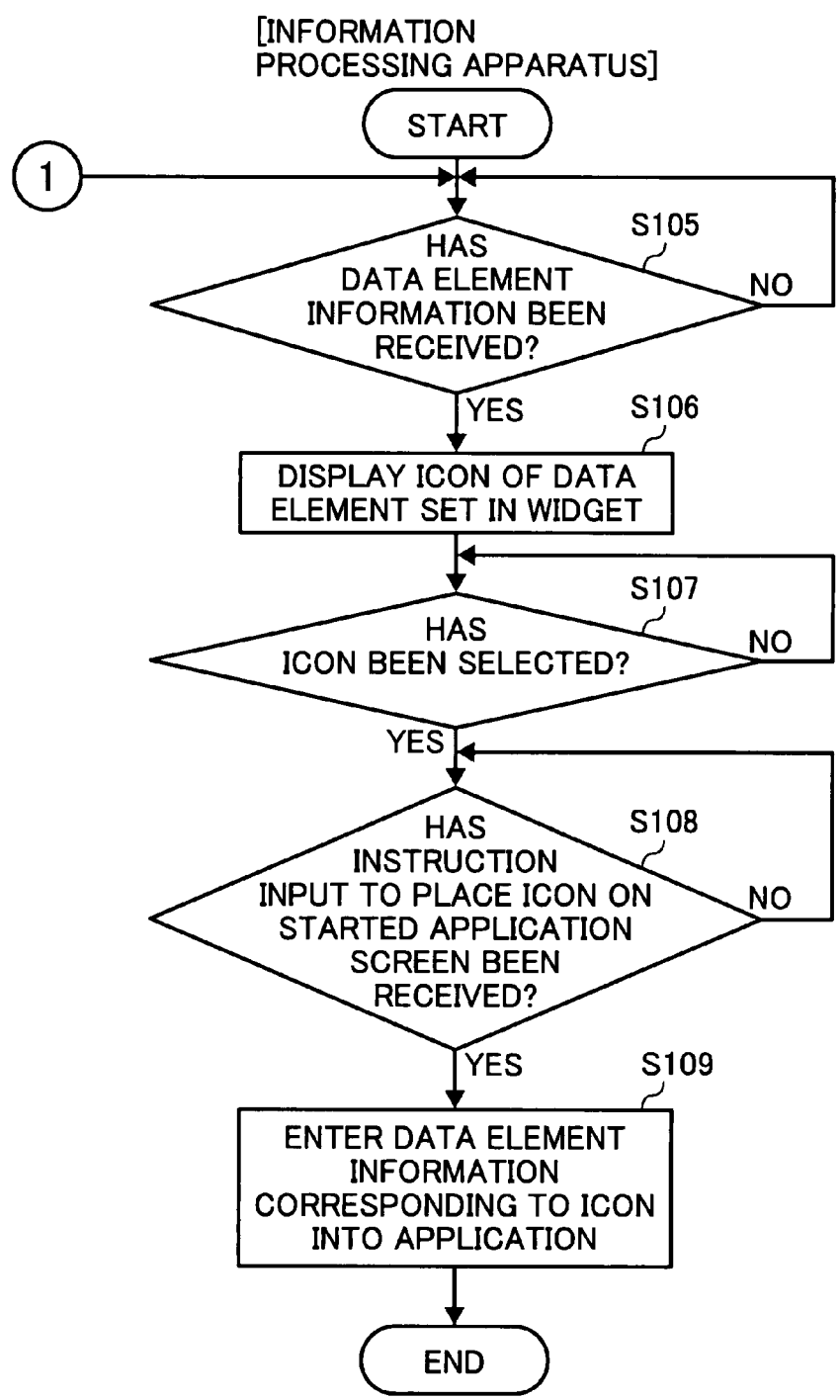

FIG. 8 is a flowchart of the operation of the information delivery system according to the first embodiment. The scanner 1 reads data, the input processor 2 converts the read analog data to digital data, and the information delivery apparatus 100 receives the digital data. The analysis unit 12 analyzes the read image data. The analysis unit 12 analyzes an attribute of data based on recognition of an area performed by the area recognition unit 121 and based on analysis of the attribute by the attribute analyzer 122, to extract a data element. The layout analyzer 1211 analyzes layout and the character analyzer 1212 analyzes text information. The character analyzer 1212 analyzes a character by using an OCR process and a character extracting process. The analysis unit 12 analyzes the attribute information and extracts a data element (step S101).

The first display controller 14 displays the preview screen in a preview image mode (see 620 in FIG. 6) in which the data element is input and the element image display (see 650 in FIG. 6) in the element image mode in which the selected data element is displayed. The first display controller 14 generates display data to display the display data for each data element analyzed in the preview image mode (step S102). At this step, because a selection input is not yet received from the operator, the element image display represents a state of a new creation screen. The first operation display unit 11 displays the preview screen 620 and the element image display 650 in parallel for each data element generated by the first display controller 14.

The first operation display unit 11 determines whether a selection input is received for the data element in the preview screen 620 (step S103). When the operator selects the data element and sends an input to set the data element in the element image display 650 by using the drag-and-drop operation (YES at step S103), the first operation display unit 11 receives the input.

The first operation display unit 11 selects a data element in the preview screen 620 for each data element generated by the first display controller 14 to set the selected data element in the element image display 650 by the drag-and-drop operation (FIG. 6). A new screen can also be configured to set all the data elements displayed in the preview screen 620, in the element image display. In this case, during the selection operation by the operator, any unnecessary portion is deleted as required. The data elements in both modes are associated with each other by the first display controller 14.

The first communication unit 15 transmits information for the selected data element to the information processing apparatus 200 through the network 3 (step S104). The second communication unit 61 detects whether the data element information has been received (step S105). When the data element information has been received, the second display controller 64 displays an icon of the data element being set in the contents bar (widget) 750 (FIG. 7) in the second operation display unit 65 (step S106).

The second operation display unit 65 detects whether the icon has been selected through the display screen (step S107). When the icon has been selected (YES at step S107), the second operation display unit 65 further detects whether an instruction input to place the selected icon on the screen or window of an active application has been received (step S108). In other words, it is detected whether an input indicating a drag-and-drop operation, such that the data element displayed in the contents bar 750 is dragged and dropped onto a screen of another application running thereon, has been received.

When the input indicating the drag-and-drop operation is detected (YES at step S108), the information processor 62 enters the data element information corresponding to the icon into the application according to the instruction input (step S109).

With this configuration, the image forming apparatus extracts each data element from input data and displays extracted data elements. When receiving input to select any one of the displayed data elements from the operator, the image forming apparatus transmits the selected data element to the information processing apparatus. The information processing apparatus displays the data element on the display screen to place it on the screen of another application running thereon, thus using the data element. Therefore, it is possible to obtain a highly user-friendly information delivery system in which the data element extracted from the input data by the image forming apparatus is displayed in the information processing apparatus and can be used in the application without being aware of the operation for data conversion.

The second operation display unit of the information processing apparatus is desirably configured to display the contents bar in the form of a display bar and to perform an instruction input by at least either one of the drag-and-drop operation and the copy-and-paste operation. This is because data elements are displayed in an easy-to-view form, and thus, the displayed data elements can be used in the application on the screen with a simple operation.

It is desirable that the analysis unit 12 generates data element information in a data format according to the attribute of the data element to be analyzed, and that the information processor 62 enters the data element information displayed on the second operation display unit 65 into the application in the data format based on the application and the attribute of the data element information. For example, if the data element to be analyzed is text information, data element information is generated in the text file. If the data element is image information, then data element information is generated with the image information, and file capacity upon transmission can thereby be suppressed. When the text information or the image information is entered into another application through the screen of the information processing apparatus in a form of a text file or an image file, it is also possible to display the information more accurately.

It is desirable that the first operation display unit 11 receives an input to determine an attribute of the data element to be displayed and the analysis unit 12 determines the attribute of the data element according to the received input. This is because the attribute can accurately be determined based on the operator's determination.

It is further desirable that the first operation display unit 11 receives an input to specify an area of data to be displayed and the analysis unit 12 determines the attribute of the area specified by the received input to extract a data element. This is because the data element information can be extracted only from the area determined by the operator as being necessary and this enables efficient extraction of the data element.

It is further desirable that the first operation display unit 11 receives an input to specify a shape of an area of data to be displayed as a block. This is because by specifying the area with a block, the data element information can be extracted only from the required area with a simple operation, to enable efficient operation.

It is also desirable that the storage unit 13 stores therein the data element information of which selection input is received from the first operation display unit 11 and the first communication unit 15 reads the data element information from the storage unit 13 to be transmitted. This is because the data element information stored in the storage unit 13 can be collectively transmitted at an appropriate time for transmission to enable enhancement of communication efficiency.

It is also desirable that even when the data is input and the image forming apparatus executes another function, the analysis unit 12 analyzes a data element in parallel to the execution. This is because the data element information can be extracted in the background even when the image forming apparatus executes another function, to enable extraction of highly usable data element information.

It is also possible to automatically deliver all the data elements extracted by the analysis unit 12. This enables input data to be automatically analyzed and all the data element information included in the data to be automatically delivered.

An information delivery system according to a second embodiment differs from that of the first embodiment in that the information processing apparatus transmits identification information to the image forming apparatus and the image forming apparatus transmits data element information to a destination corresponding to the received identification information. This enables the image forming apparatus to automatically determine a destination and transmit data element information to the destination.

Figure 9:
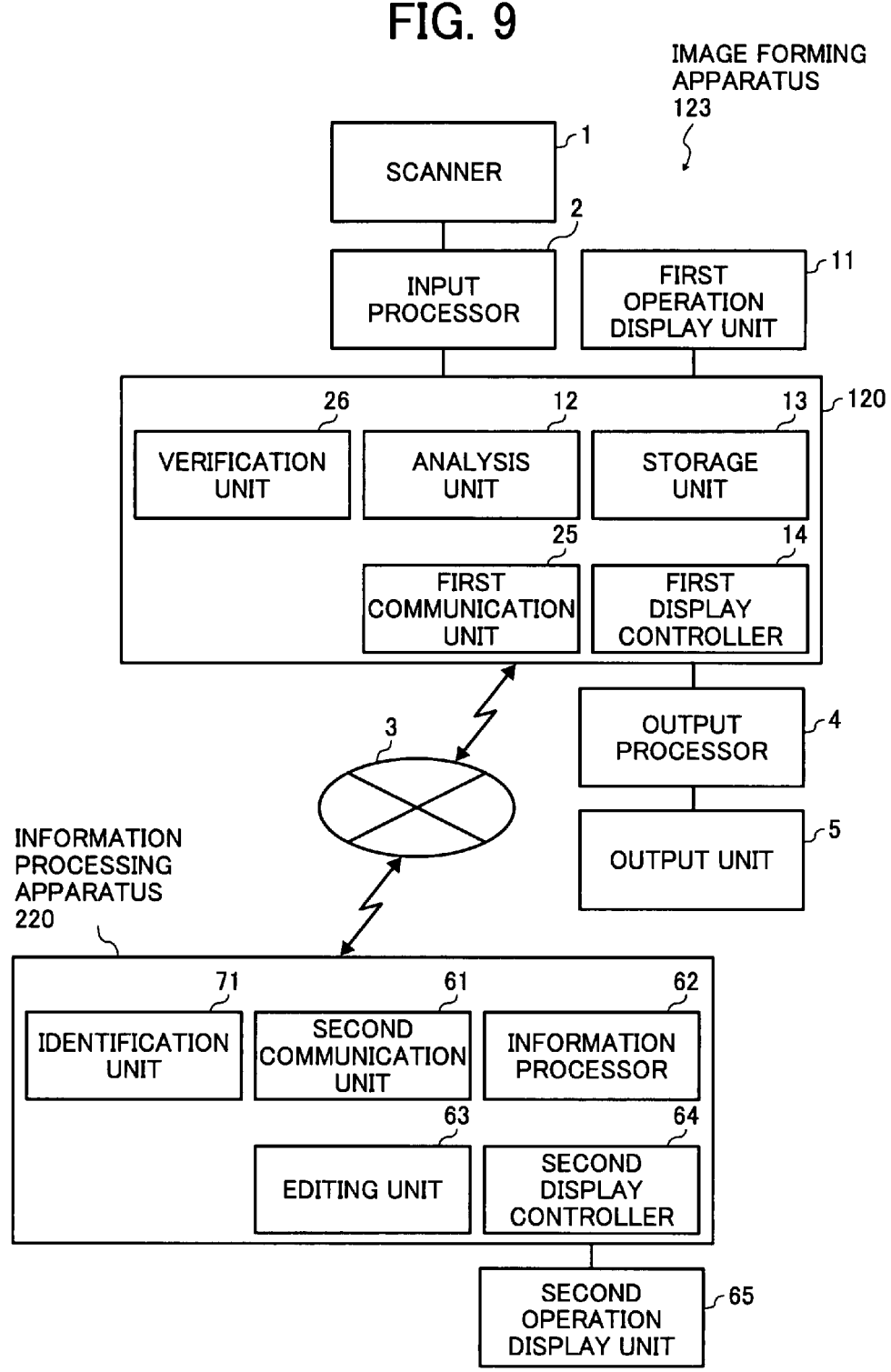
FIG. 9 is a functional block diagram of an information delivery system according to a second embodiment of the present invention.

FIG. 9 is a functional block diagram of the information delivery system according to the second embodiment. An information processing apparatus 220 receives identification information from the second operation display unit 65. A first communication unit 25 of an information delivery apparatus 120 provided in an image forming apparatus 123 receives the identification information and transmits data element information to a corresponding destination according to a correspondence table (not shown) between identification information and destination stored in the storage unit 13.

The information processing apparatus 220 further includes an identification unit 71 that identifies received identification information. Therefore, it is desirable that only when the received identification information is legitimate, the identification information is transmitted to the information delivery apparatus 120. This enables to determine whether an operator who operates the information processing apparatus 220 has an access right and to receive data element information from the information delivery apparatus 120 to be displayed only when the operator has the access right.

It is further desirable that the information delivery apparatus 120 includes a verification unit 26 that verifies whether received identification information is legitimate. This enables the data element information to be transmitted only to a destination of which verification is successful.

The second communication unit 61 of the information processing apparatus 220 desirably transmits an address on network containing its Internet Protocol (IP) address as identification information. With this configuration, the address of the apparatus is automatically transmitted or is transmitted manually by the operator to enable data element information to be transmitted from the image forming apparatus.

Figure 10:
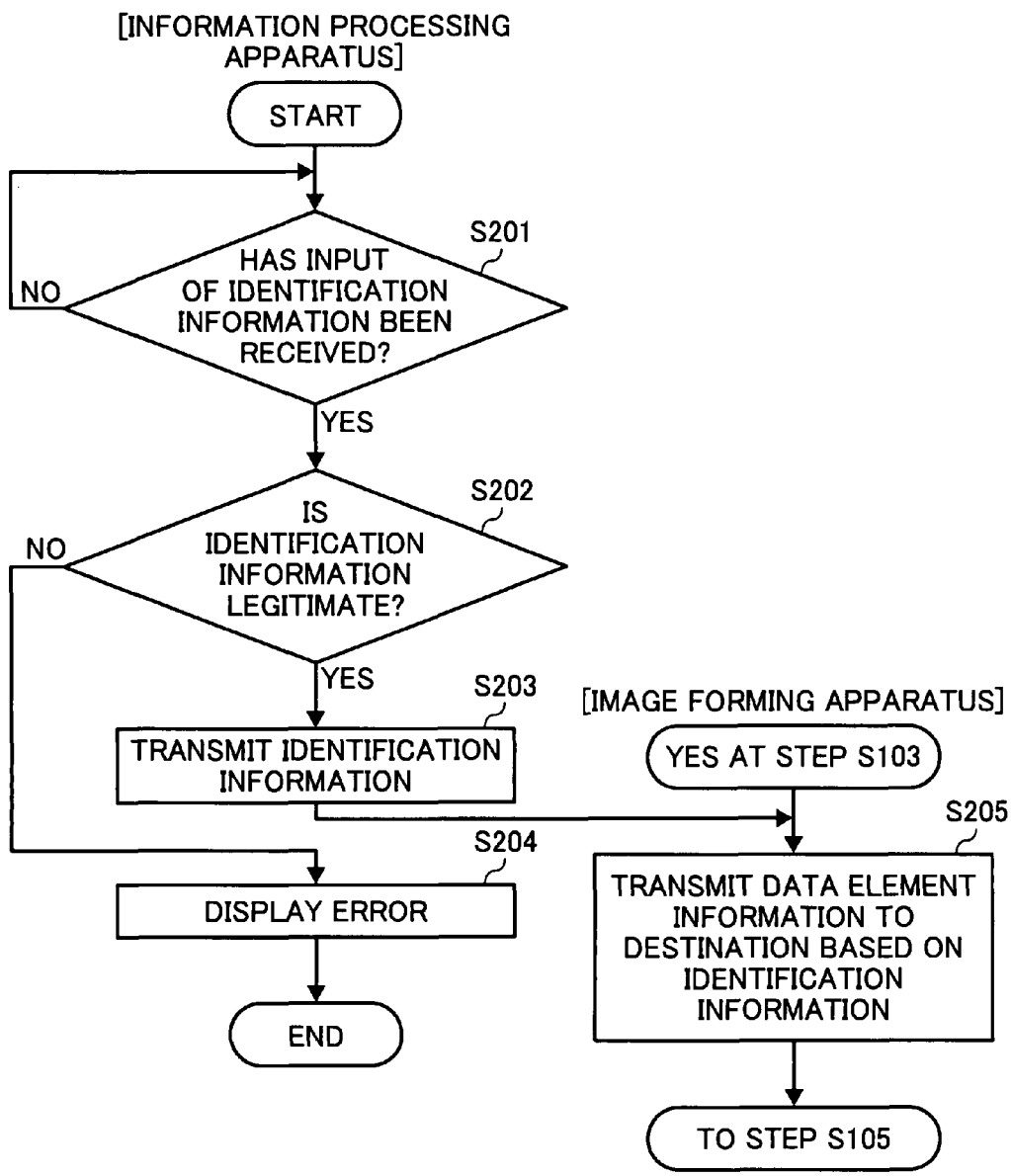
FIG. 10 is a flowchart of the operation of the information delivery system shown in FIG. 9.

FIG. 10 is a flowchart of the operation of the information delivery system according to the second embodiment. The information processing apparatus 220 detects whether the second operation display unit 65 receives an input of identification information (step S201). When the second operation display unit 65 receives the identification information (YES at step S201), the identification unit 71 determines whether the received identification information is legitimate (step S202). When the identification information is legitimate (YES at step S202), the second communication unit 61 transmits the identification information to the image forming apparatus (step S203).

On the other hand, when the identification information is not legitimate (NO at step S202), the second operation display unit 65 displays an error and finishes the operation (step S204).

In the image forming apparatus that receives the identification information, when the first operation display unit 11 receives a selection input for the data element (YES at step S103), the first communication unit 15 transmits the selected data element to a corresponding destination by referring to the identification information and an association table (step S205).

As explained above, in the information delivery system according to the second embodiment, the image forming apparatus receives the identification information from the information processing apparatus and transmits the data element information only to a destination of the corresponding identification information. Thus, the image forming apparatus automatically determines the legitimate destination to enable transmission of the data element information thereto.

An information delivery system according to a third embodiment differs from that of the first embodiment in that the second operation display unit displays an editing mode screen on which the data element information is displayed and through which an editing input is received. The editing unit edits the data element information according to the editing input received through the editing mode screen, and the second operation display unit 65 displays again the edited data element information.

Figure 11:
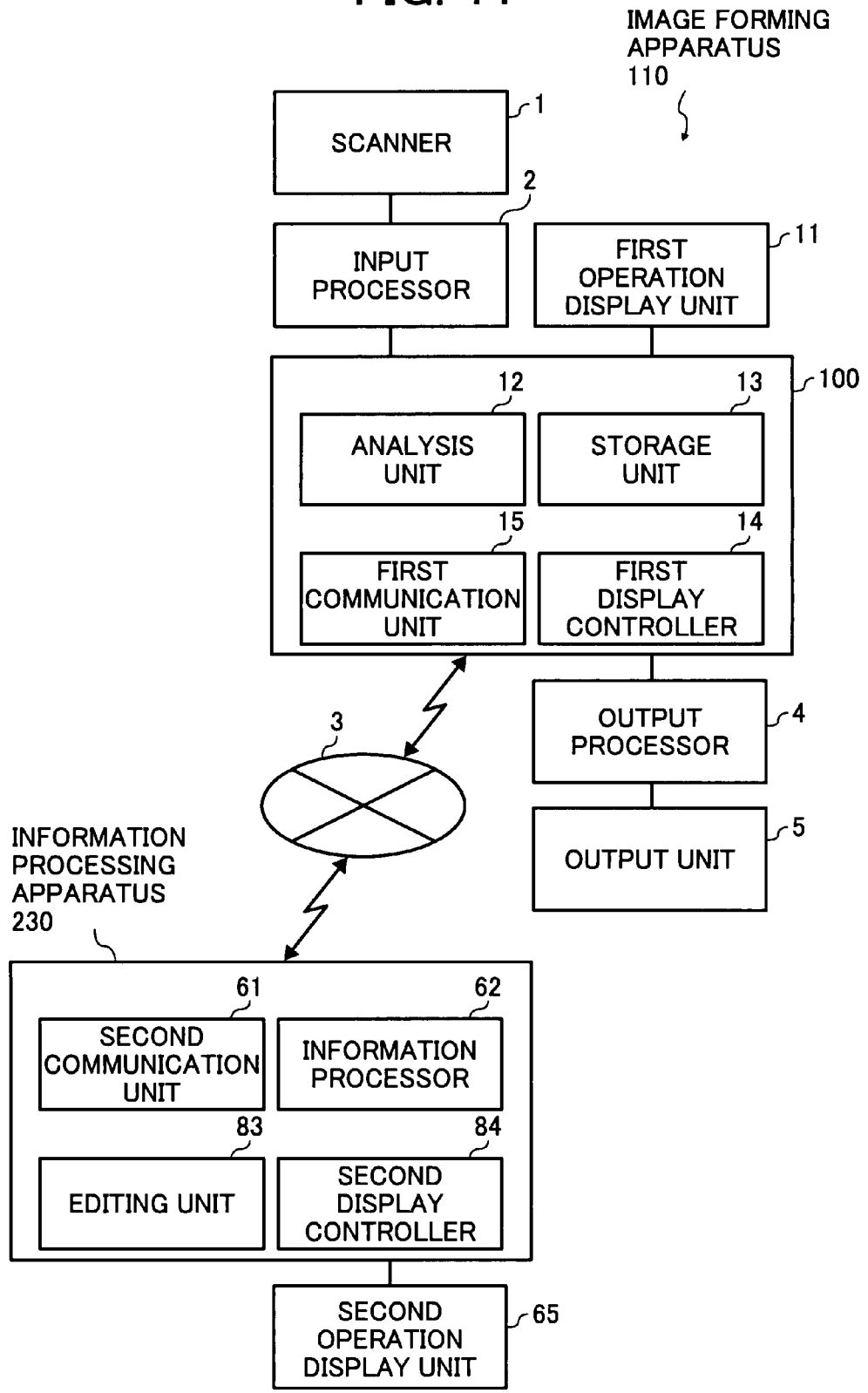
FIG. 11 is a functional block diagram of an information delivery system according to a third embodiment of the present invention.

FIG. 11 is a functional block diagram of the information delivery system according to the third embodiment. A second display controller 84 of an information processing apparatus 230 causes the second operation display unit 65 to display the editing mode screen on which data element information is displayed and through which an editing input is received. An editing unit 83 edits the data element information according to the editing input received through the editing mode screen in the second operation display unit 65. The second display controller 84 causes the second operation display unit 65 to display the edited data element information.

With this configuration, the data element displayed in the information processing apparatus is subjected to editing to enable the result after the editing to be displayed.

Figure 12:
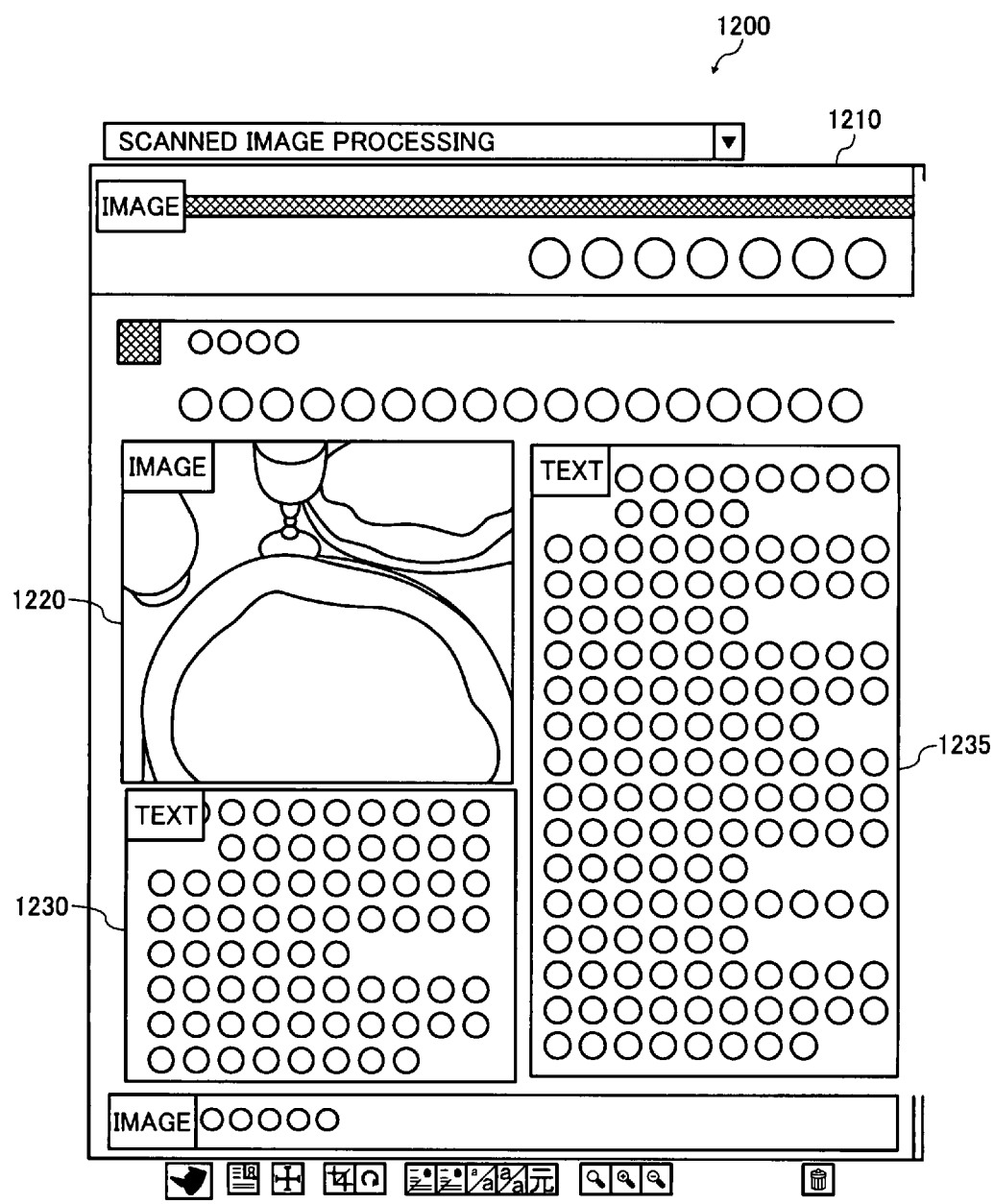
FIG. 12 is one example of an editing mode screen displayed in an information processing apparatus shown in FIG. 11.

FIG. 12 is one example of an editing mode screen displayed in an information processing apparatus according to the third embodiment. Data elements 1210, 1220, 1230, and 1235 are displayed on an editing mode screen 1200. For example, the location of the data element (header image) 1210 represented by an image is modified by an input operation from the operator, and the header after modified (not shown) can be displayed. Moreover, the operator performs an input operation to order the data elements 1230 and 1235 which are text elements, and the ordering can be indicated by arrows.

FIG. 13 is a flowchart of the operation of the information delivery system according to the third embodiment. The second display controller 84 causes the second operation display unit 65 to display a screen in an editing mode on which the data element information is displayed and through which an editing input is received (step S301). The second operation display unit 65 detects whether an editing input has been received from the data element information displayed in the editing mode (step S302). When it is detected that the editing input has been received (YES at step S302), the editing unit 83 subjects the data element information to editing according to the received editing input (step S303). The second operation display unit 65 again displays the edited data element information (step S304).

As explained above, the information processing apparatus 230 subjects the displayed data element to editing, and can display the result after the editing.

The second operation display unit 65 updates the data element information with the edited data element information to be displayed, and, in addition to this, can also display an updated element image in parallel with an element image before updated. Alternatively, the display before updated can be lightly shaded. Because the pieces of element information before and after editing can be compared with each other.

An information delivery system according to a fourth embodiment differs from that of the first embodiment in that the data element displayed in the contents bar is stored as shared data in another information processing apparatus. In the fourth embodiment, the information processing apparatus includes a search unit. The second operation display unit receives a search request input to search for a data element to be displayed in a contents bar, and the search unit generates search request information used to search for the data element stored as shared data in another information processing apparatus based on the received search request input, to transmit the search request information through the network.

Figure 14A:
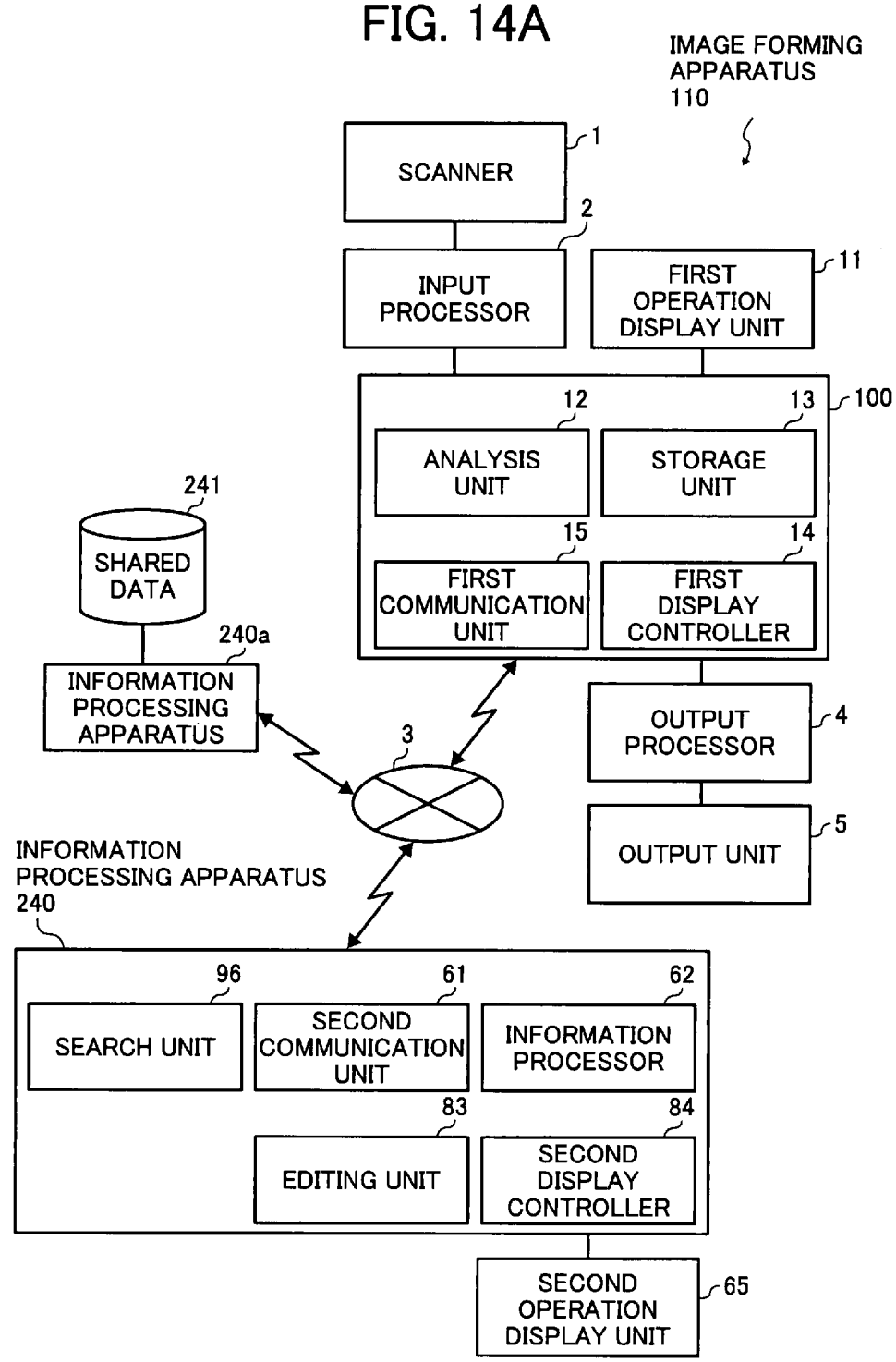
FIG. 14A is a functional block diagram of an information delivery system according to a fourth embodiment of the present invention.
Figure 14B:
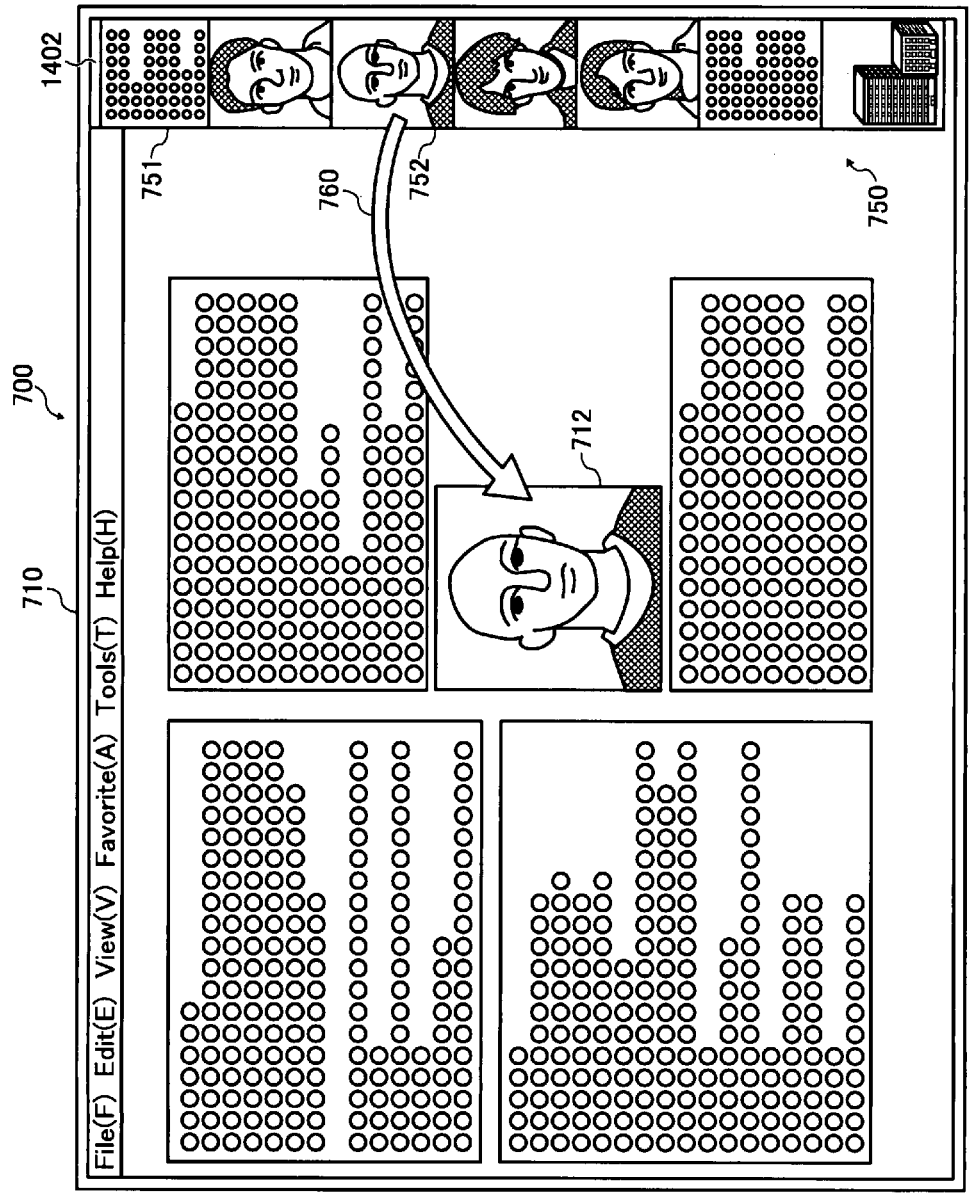
FIG. 14B is one example of a display screen of a second operation display unit shown in FIG. 14A.

FIG. 14A is a functional block diagram of the information delivery system according to the fourth embodiment. In another information processing apparatus 240a, a data element is stored in its storage unit as shared data 241. A search unit 96 is included in an information processing apparatus 240 of the information delivery system according to the fourth embodiment. The second operation display unit 65 receives a search request input to search for a data element as the shared data in the other information processing apparatus 240a from a search field 1402 shown in FIG. 14B. The search unit 96 generates search request information used to search for the data element to be displayed in a contents bar of the second operation display unit from the shared data 241 stored in another information processing apparatus through the network, to transmit the generated search request information.

Figure 15:
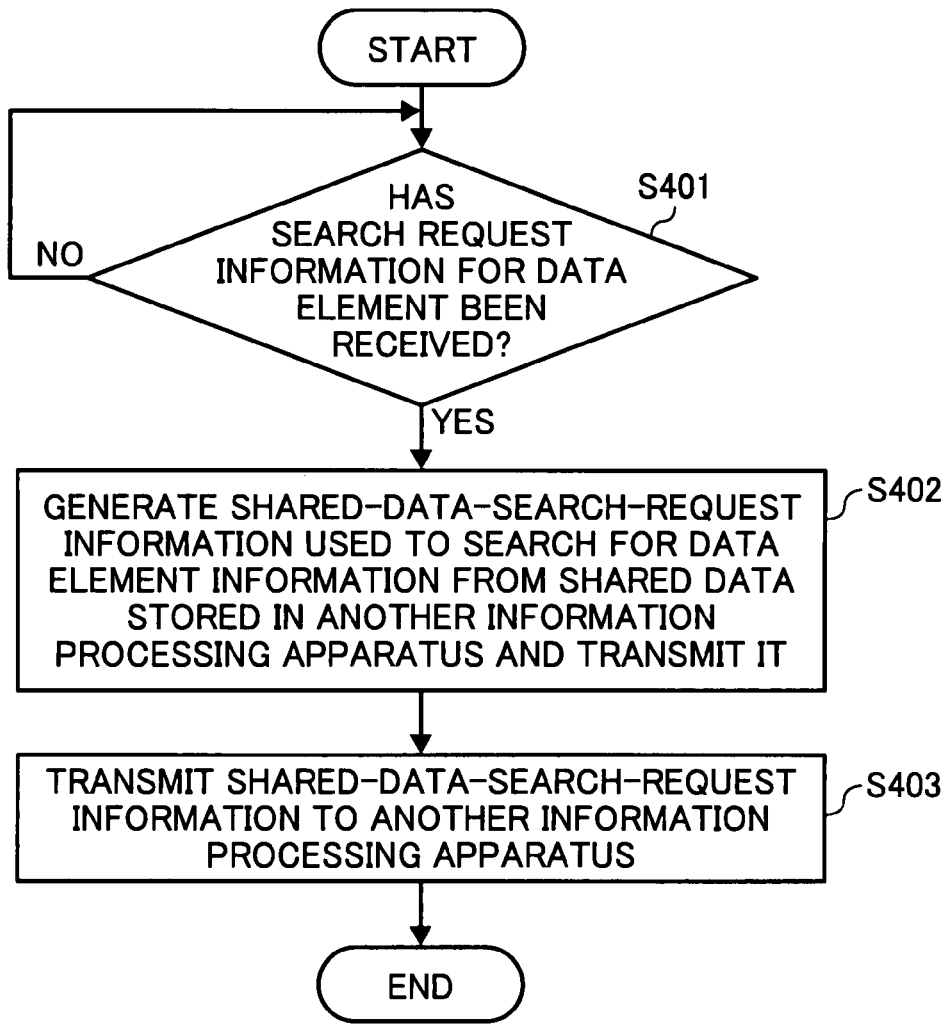
FIG. 15 is a flowchart of the operation of the information delivery system shown in FIG. 14A.

FIG. 15 is a flowchart of the operation of the information delivery system according to the fourth embodiment. The second operation display unit 65 of the information processing apparatus 240 detects whether the search request information for the data element has been received (step S401). When the search request information has been received (YES at step S401), the search unit 96 generates shared-data-search-request information used to search for the data element stored as the shared data 241 in another information processing apparatus and transmit it (step S402). The second communication unit 61 transmits the shared-data-search-request information to another information processing apparatus (step S403). When the data element is searched from the other information processing apparatus 240a to acquire the data element, the data element is transmitted, and the second communication unit 61 receives the data element.

With this feature, it is also possible to display even a data element, which the information processing apparatus 240 does not retain, in the contents bar of the information processing apparatus 240, by searching for the data element retained as the shared data in the other information processing apparatus 240a and transmitting it to be acquired.

It is noted that the other information processing apparatus 240a can be configured to display the data element as the shared data 241 in the contents bar of the other information processing apparatus 240a.

The search unit 96 can also be configured to search for data element information stored as the shared data in the storage unit 13 of the image forming apparatus through the network.

Figure 16:
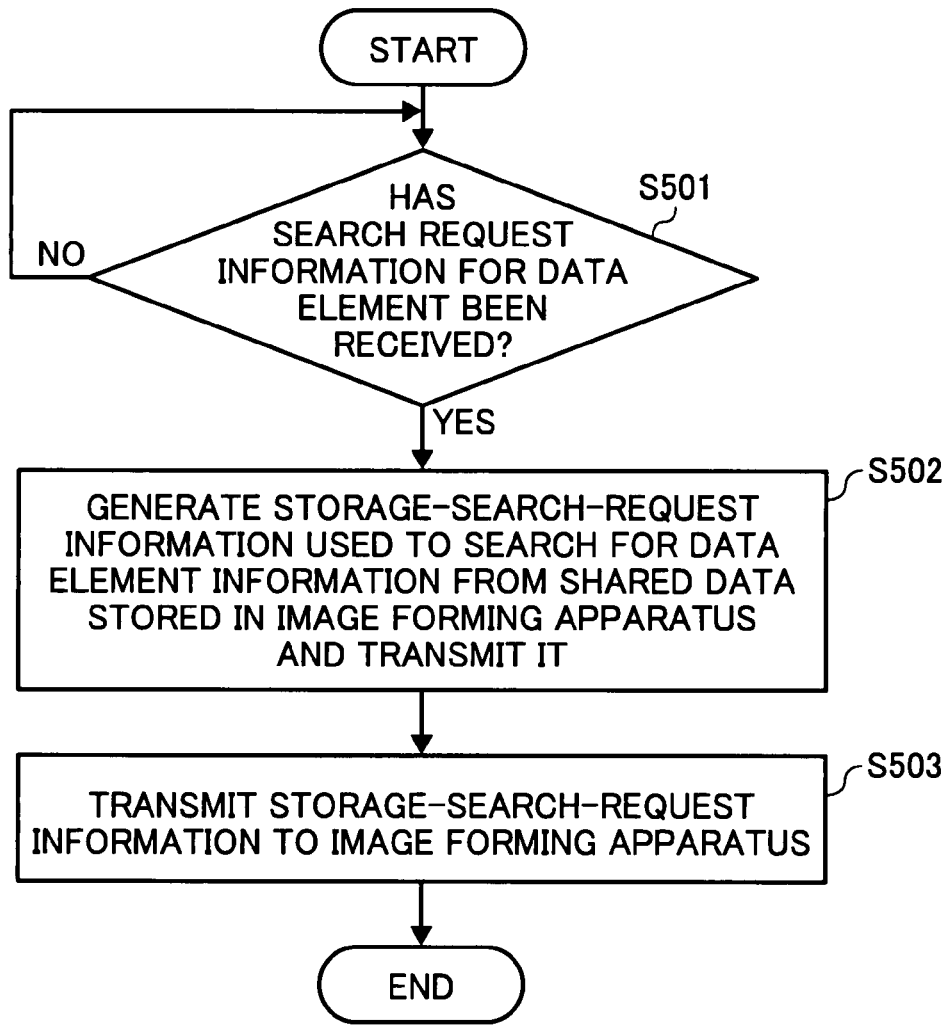
FIG. 16 is a flowchart of the operation of an information delivery system according to a modification of the fourth embodiment.

FIG. 16 is a flowchart of the operation of the information delivery system according to a modification of the fourth embodiment. The second operation display unit 65 of the information processing apparatus 240 detects whether search request information for the data element stored as the shared data in the storage unit 13 of the image forming apparatus has been received (step S501). When the search request information has been received (YES at step S501), the search unit 96 generates storage-search-request information used to search for the data element stored as the shared data in the storage unit 13 of the image forming apparatus to be transmitted through the network (step S502). The second communication unit 61 transmits the storage-search-request information to the image forming apparatus (step S503). When the data element is searched from the storage unit 13 and acquired, the data element is transmitted and the second communication unit 61 receives the data element.

With this feature, the information processing apparatus 240 acquires the data element information stored as the shared data in the storage unit 13 of the image forming apparatus, and can display the data element in its own contents bar.

Figure 17:
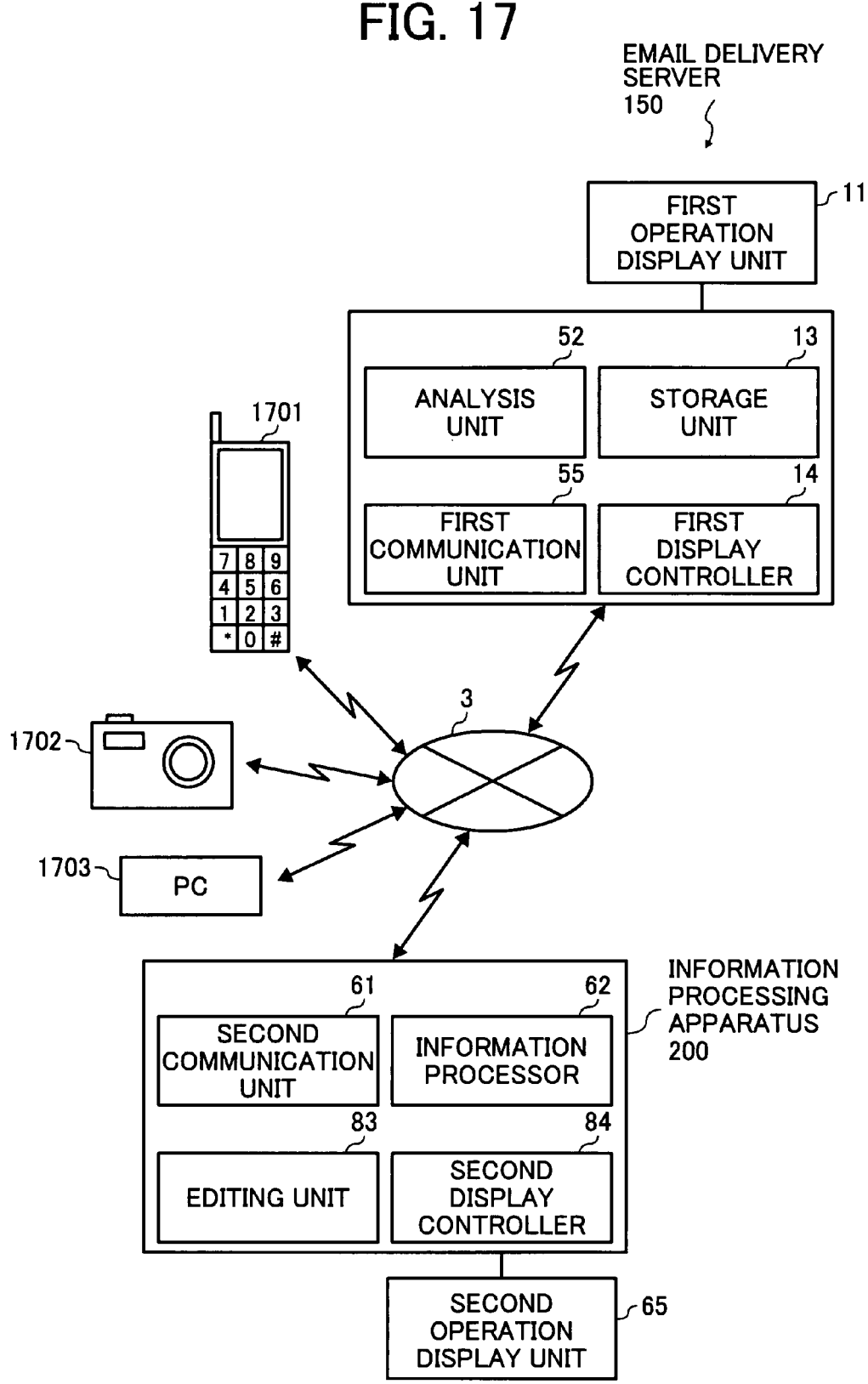
FIG. 17 is a functional block diagram of an information delivery system according to a fifth embodiment of the present invention.

FIG. 17 is a functional block diagram of an information delivery system according to a fifth embodiment of the present invention. The information delivery system according to the fifth embodiment has a difference from that of the first embodiment in that there is no need to include the scanner 1, the input processor 2, the output processor 4, and the output unit 5 in the image forming apparatuses explained in the first to the fourth embodiments. In other words, the information delivery system according to the fifth embodiment includes an email delivery server 150 (data delivery server) instead of the image forming apparatus. For example, when an email containing image information is transmitted to a destination as the user of the information processing apparatus 200 from a mobile phone 1701, a digital camera 1702, or a personal computer (PC) 1703, to deliver the email to the specified destination, a first communication unit 55 of the email delivery server 150 temporarily receives the email, and an analysis unit 52 analyzes the received email containing the image to extract data elements. The analysis of the email and the extraction of the data elements are performed in the same manner as that of the first to the fourth embodiments.

With this feature, the email delivery server 150 extracts the data element from the email to transmit the data element to the information processing apparatus 200 used by the user as the specified destination, and thus, the data element can be displayed in the information processing apparatus 200. Therefore, the data element can be extracted simply by transmitting the image captured by the mobile phone 1701 or by the digital camera 1702 and the image captured by the PC 1703 by email. Thus, the user does not have to perform a plurality of processes such as the OCR process and the email transmission, which allows improvement of the user's usability.

Figure 18:
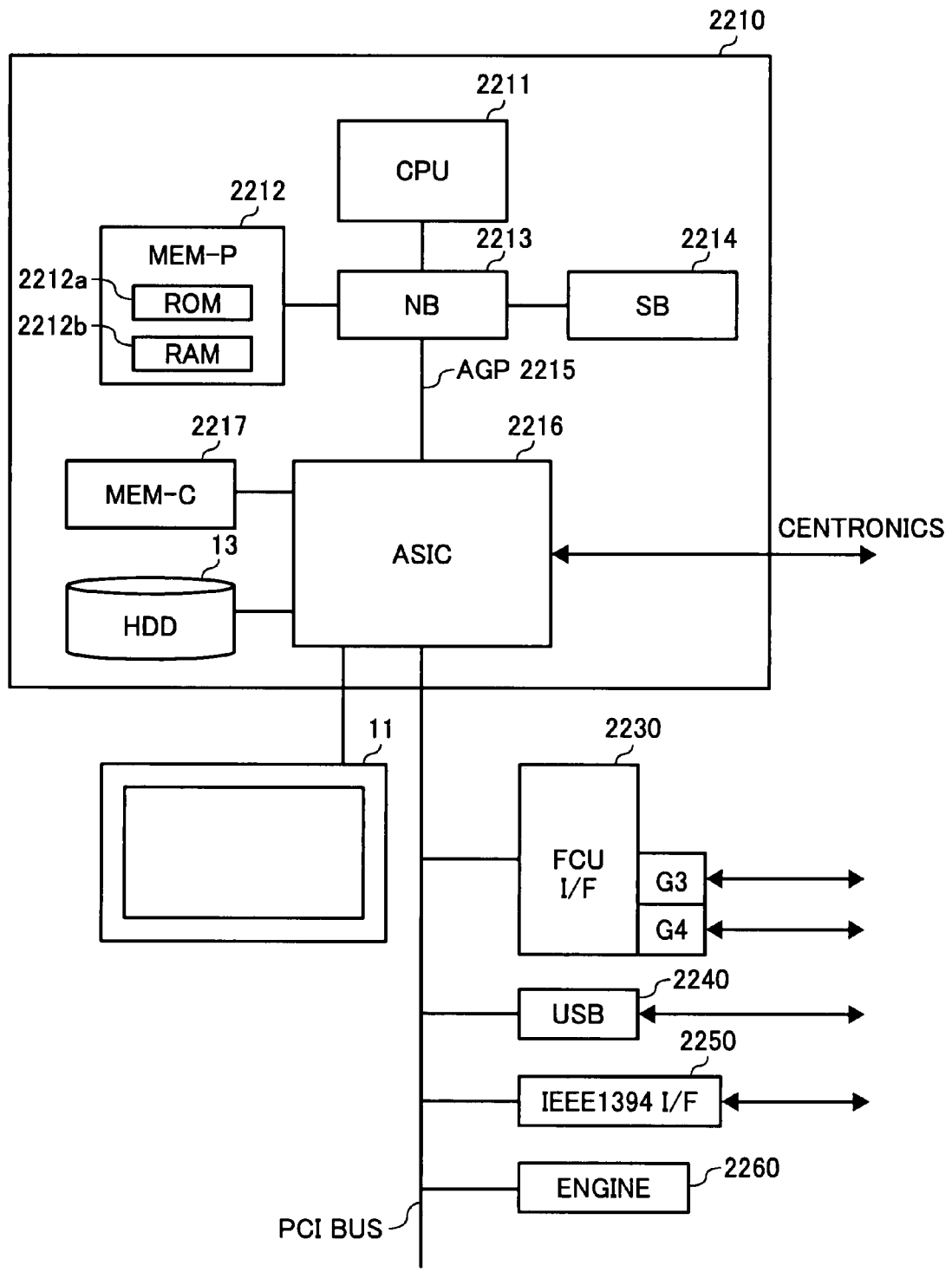
FIG. 18 is a block diagram of a hardware configuration of the image forming apparatus according to the embodiments.

FIG. 18 is a block diagram of a hardware configuration of the image forming apparatus according to the embodiments. The image forming apparatus is configured as, for example, a multifunction product (MFP) that has multifunction such as a facsimile function and a scanning function. As shown in FIG. 18, the MFP includes a controller 2210 and an engine 2260 which are connected to each other through a Peripheral Component Interconnect (PCI) bus. The controller 2210 controls inputs from a Facsimile Control Unit interface (FCU I/F) 2230 and the first operation display unit 11, such as control of the MFP, image display control, various types of controls, image processing control, and information delivery control. The engine 2260 is an image processing engine or the like which can be connected to the PCI bus, and an image processing portion such as error diffusion and gamma-conversion performed on acquired image data is included therein.

The controller 2210 includes a Central Processing Unit (CPU) 2211, a northbridge (NB) 2213, a system memory (MEM-P) 2212, a southbridge (SB) 2214, a local memory (MEM-C) 2217, an Application Specific Integrated Circuit (ASIC) 2216, and a Hard Disk Drive (HDD) 13 as the storage unit. The NB 2213 and the ASIC 2216 are connected to each other through an Accelerated Graphics Port (AGP) bus 2215. The MEM-P 2212 includes a Read Only Memory (ROM) 2212a and a Random Access Memory (RAM) 2212b.

The CPU 2211 controls the MFP, and has a chipset including the NB 2213, the MEM-P 2212, and the SB 2214. The CPU 2211 is connected to other devices through the chipset.

The NB 2213 is a bridge that connects the CPU 2211 to the MEM-P 2212, the SB 2214, and the AGP 2215, and includes a memory controller, a PCI master, and an AGP target. The memory controller controls read/write from/to the MEM-P 2212.

The MEM-P 2212 is a system memory that stores therein computer programs and data and used to load computer programs and data. The MEM-P 2212 includes the ROM 2212a and the RAM 2212b. The ROM 2212a stores therein the computer programs and data, and the RAM 2212b is a rewritable and readable memory into which the computer programs and data are loaded and is used for image drawing upon image processing.

The SB 2214 is a bridge that connects the NB 2213 to a PCI device and peripheral devices. The SB 2214 is connected to the NB 2213 through the PCI bus, which is also connected with the FCU I/F 2230 or the like.

The ASIC 2216 is an Integrated Circuit (IC), for multimedia information processing, which includes a hardware element for multimedia information processing. The ASIC 2216 serves as a bridge to connect the AGP 2215, the PCI bus, the HDD 13, and the MEM-C 2217 to each other.

The ASIC 2216 connects a Universal Serial Bus (USB) 2240 and an IEEE 1394 (the Institute of Electrical and Electronics Engineers 1394) I/F 2250, through the PCI bus, to a PCI target and an AGP master, an arbiter (ARB) that forms a core of the ASIC 2216, a memory controller that controls the MEM-C 2217, a plurality of Direct Memory Access Controllers (DMACs) that rotate image data by a hardware logic, and the engine 2260.

The MEM-C 2217 is a local memory used as an image buffer for transmission and a code buffer. The HDD 13 stores therein image data, computer programs, font data, and forms.

The AGP 2215 is a bus interface for graphics accelerator card that is proposed to increase the speed of graphic processing, and high-throughput direct access to the MEM-P 2212 allows the speed of the graphics accelerator card to be increased.

The first operation display unit 11 connected to the ASIC 2216 receives input indicating operation by the operator and transmits received input information to the ASIC 2216.

A computer program (hereinafter, "information delivery program") executed in the MFP according to the embodiments is provided as previously stored in the ROM and the like.

The information delivery program can be provided as recorded on a computer-readable recording medium such as a Compact Disk Read Only Memory (CD-ROM), a Flexible Disk (FD), Compact Disk Recordable (CD-R), and a Digital Versatile Disk (DVD) in a file of an installable format or of an executable format.

The information delivery program can be provided as stored in a computer connected to a network such as the Internet and downloaded via the network. The information delivery program can also be provided or distributed via a network such as the Internet.

The information delivery program includes modules that implement the aforementioned components (analysis unit 12, storage unit 13, first display controller 14, and first communication unit 15, etc.). As actual hardware, the CPU (processor) loads the information delivery program from the ROM into a main storage unit to execute it. Thus, the analysis unit 12, the storage unit 13, the first display controller 14, and the first communication unit 15 or the like are implemented on the main storage unit.

Figure 19:
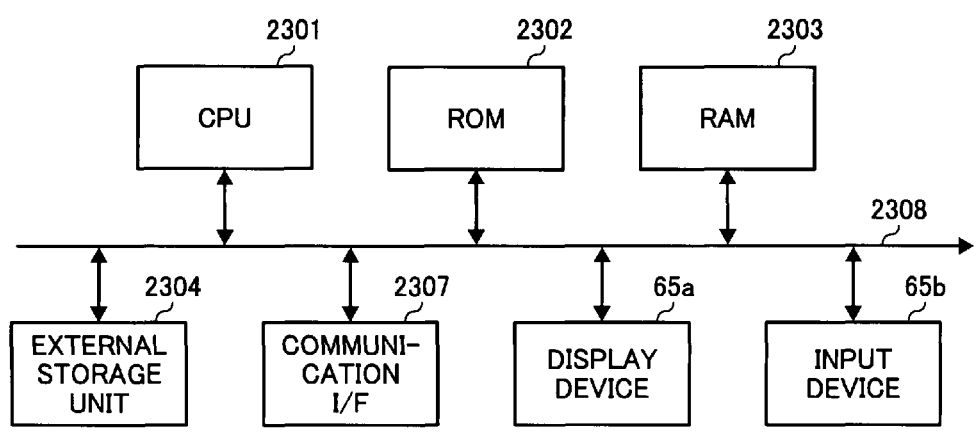
FIG. 19 is a block diagram of a hardware configuration of the information processing apparatus according to the embodiments.

FIG. 19 is a block diagram of a hardware configuration of the information processing apparatus according to the embodiments. The information processing apparatus includes a control unit such as a CPU 2301, a storage unit such as ROM 2302 and RAM 2303, an external storage unit 2304 such as a HDD and a CD drive, a display device 65*a* in the second operation display unit 65, an input device 65*b* such as a touch input mechanism, a keyboard, and a mouse, a communication I/F 2307, and a bus 2308 connecting these components to one another, which realizes the hardware configuration using an ordinary computer.

A computer program (hereinafter, "information processing program") executed by the information processing apparatus according to the embodiments is provided as recorded on a computer-readable recording medium such as a CD-ROM, a Flexible Disk (FD), CD-R, and a DVD in a file of an installable form or an executable form.

The information processing program can be provided as stored in a computer connected to a network such as the Internet and downloaded via the network. The information processing program can also be provided or distributed via a network such as the Internet. The information processing program can be provided as previously stored in the ROM and the like.

The information processing program includes modules that implement the aforementioned components (second communication unit, information processor, editing unit, and second display controller, etc.). As actual hardware, the CPU (processor) loads the information processing program from the storage medium into a main storage unit to execute it. Thus, the second communication unit, the information processor, the editing unit, the second display controller, and the like are implemented on the main storage unit.

As set forth hereinabove, according to an embodiment of the present invention, an image forming apparatus analyzes data to extract a data element. Upon identifying attribute of the data element as text, the image forming apparatus performs character recognition on the data element, and displays the data element. When receiving input to select the data element, the image forming apparatus transmits the data element to an information processing apparatus through a network. Thus, the data element extracted from the input data can be delivered with less process, which improves convenience for users.

Moreover, an email delivery server receives email containing image information, and analyzes the email to extract a data element. Upon identifying attribute of the data element as text, the email delivery server performs character recognition on the data element, and transmits the data element to a destination of the email through a network. Thus, a data element can be extracted without processes such as the OCR process when a user simply transmits email containing an image. This improves convenience for the user.

Furthermore, having received the data element from the image forming apparatus, the information processing apparatus displays the data element as a symbol at a predetermined position on its screen. Upon receiving input to select the symbol and place it on the window of an application, the information processing apparatus enters the data element indicated by the symbol into the application. Thus, the data element extracted from the input data by the image forming apparatus is displayed and can thereby be used in another application, which also improves convenience for users.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. An information delivery system comprising:
   an image forming apparatus; and
   an information processing apparatus; and
   wherein the image forming apparatus includes:
      an input unit configured to receive data of a document image read from a document;
      an analysis unit configured to analyze attributes of data elements constituting the data and extract, from the data, the data elements divided for each attribute;
      a first operation display unit configured to display the extracted data elements and allow an operator to select at least one data element from the extracted data elements; and
      a first communication unit configured to transmit the selected data element to the information processing apparatus; and
   the information processing apparatus includes:
      a second communication unit configured to receive the data element from the image forming apparatus;
      a second operation display unit configured to display the received data element and allow an operator to select, from the received data element, a data element to be imported into an application running on the information processing apparatus; and an information processor configured to import the selected data element into the application.

2. The information delivery system according to claim 1, wherein the attributes of the data elements include text, image, chart, and graph.

3. The information delivery system according to claim 1, wherein the first communication unit transmits the selected data element based on identification information received from the information processing apparatus.

4. An information delivery system comprising:
an electronic mail delivery server; and
an information processing apparatus; and
wherein the electronic mail delivery server includes:
   a first communication unit configured to receive an electronic mail containing data of a document image;
   an analysis unit configured to analyze attributes of data elements constituting the data and extract, from the data, the data elements divided for each attribute, wherein an operator can input an attribute for the data elements; and
   a transmitting unit configured to transmit the data elements to the information processing apparatus; and
the information processing apparatus includes:
   a second communication unit configured to receive the data elements from the electronic mail delivery server;
   an operation display unit configured to display the received data elements and allow the operator to select, from the received data elements, a data element to be imported into an application running on the information processing apparatus; and
   an information processor configured to import the selected data element into the application.

5. The information delivery system according to claim 4, wherein the attributes of the data elements include text, image, chart, and graph.

6. The information delivery system according to claim 4, wherein the display unit displays a symbol in a rectangular bar displayed at a predetermined position on a screen.

7. The information delivery system according to claim 6, wherein a command is input through the display unit by any one of a drag-and-drop operation and a copy-and-paste operation.

8. The information delivery system according to claim 4, wherein the information processing apparatus further comprises an editing unit that edits the data elements according to an edit command received through the display unit, wherein the display unit displays the data elements in edit mode to receive the edit command, and displays edited data elements.

\* \* \* \* \*